US000001090H

United States Statutory Invention Registration [19]

[11] Reg. Number: H1090

Fukawa et al.

[43] Published: Aug. 4, 1992

[54] LIGHT-SENSITIVE SILVER HALIDE PHOTOGRAPHIC MATERIAL

[75] Inventors: Junichi Fukawa; Takeshi Habu, both of Hino, Japan

[73] Assignee: Konica Corporation, Tokyo, Japan

[21] Appl. No.: 617,950

[22] Filed: Nov. 27, 1990

Related U.S. Application Data

[63] Continuation of Ser. No. 392,738, Aug. 11, 1989, abandoned.

[30] Foreign Application Priority Data

Aug. 17, 1988 [JP] Japan ..... 63-205229

[51] Int. Cl.[5] ..... G03C 1/06

[52] U.S. Cl. ..... 430/264; 430/607; 430/611; 430/613; 430/614

[58] Field of Search ..... 430/264, 607, 611, 613, 430/614

[56] References Cited

U.S. PATENT DOCUMENTS

| | | | |
|---|---|---|---|
| 4,460,462 | 12/1984 | Kawaguchi et al. | 430/543 |
| 4,686,167 | 8/1987 | Resnick et al. | 430/264 |
| 4,816,373 | 3/1989 | Ohashi et al. | 430/264 |
| 4,971,888 | 11/1990 | Okada et al. | 430/264 |
| 4,985,338 | 1/1991 | Sarai et al. | 430/264 |
| 4,999,282 | 3/1991 | Sato et al. | 430/264 |
| 5,059,516 | 10/1991 | Sato et al. | 430/599 |

FOREIGN PATENT DOCUMENTS

| | | | |
|---|---|---|---|
| A0090584 | 10/1983 | European Pat. Off. . | |
| A119546 | 6/1985 | Japan . | |
| 60-119547 | 6/1985 | Japan | 430/607 |

OTHER PUBLICATIONS

Research Disclosure, No. 235, Nov. 1983, pp. 346-352, disclosure No. 23510, Havant Hampshire, Great Britain; "Development Nucleation by Hydrazine and Hydrazine Derivatives".

*Primary Examiner*—Robert L. Stoll
*Assistant Examiner*—Joseph D. Anthony
*Attorney, Agent, or Firm*—Finnegan, Henderson, Farabow, Garrett & Dunner

[57] ABSTRACT

Disclosed is a light-sensitive silver halide photographic material having a hydrophilic colloid layer containing at least one layer of a light-sensitive silver halide emulsion layer provided on a support, wherein a hydrazide derivative is contained in the light-sensitive silver halide emulsion layer, and the above hydrophilic colloid layer contains at least one of the compounds represented by Formulae [II] and [III] shown below:

Formula [II]

wherein R1, R2 and R3 are as defined in the specification,

Formula [III]

wherein R1 and R2 are as defined in the specification.

7 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

LIGHT-SENSITIVE SILVER HALIDE PHOTOGRAPHIC MATERIAL

This application is a continuation of application Ser. No. 07/392,738, filed Aug. 11, 1989, now abandoned.

BACKGROUND OF THE INVENTION

This invention relates to a light-sensitive silver halide photographic material which gives images of high contrast, more particularly to improvement of trouble generated in high contrasting technique with a hydrazide compound.

In recent years, in the field of printing photomechanical process, color formation and complication of printing are under remarkable progress. Accordingly, improvement of quality and stability of quality for light-sensitive silver halide photographic material for printing (hereinafter called printing sensitive material) which is the intermediate medium for printing have been increasingly demanded year by year. In the prior art, printing sensitive material has been generally endowed with the so called "lith development" processing aptitude for accomplishing high quality. However, in "lith development", it is impossible in mechanism to contain sulfite ion which is the preservative at high concentration in the development processing solution, and therefore stability of the developer is very poor, as is well known to those skilled in the art.

As the technique for cancelling instability of "lith development", and obtaining images of high contrast comparable to the "lith development", some attempts can be found in disclosures of patent literatures. For example, techniques for obtaining tone hardened images by use of hydrazide compounds are disclosed in Japanese Unexamined Patent Publications Nos. 16623/1978, 20921/1978, 20922/1978, 49429/1978, 66731/1978, 66732/1978, 77616/1978, 84714/1978, 137133/1978, 37732/1979, 40629/1979, 52050/1980, 90940/1980, 67843/1981 and others. In the processing method in the image forming method by use of these hydrazide compounds, in order to obtaining an image of high contrast, it is required that the pH value of the developer containing the hydrazide compound or pH value of the processing developer for the light-sensitive photographic material containing the hydrazide compound should be at high level, and such high pH value disadvantageously lowers the effective life of the developer.

In contrast, in Japanese Unexamined Patent Publication No. 106244/1981, it is described that an image of high contrast can be formed at relatively lower pH (11–11.5) by having a hydrazide compound and a development promoting amount of an amino compound contained during formation of image.

The image forming method by use of these hydrazide compounds can obtain images of very high contrast. Generally speaking, development processing solution may suffer from fog generation, etc. undesirable in photographic performance when no adequate development supplementing agent is supplemented, but in the method by use of hydrazide, even when the fatigue degree of the development processing solution is not so great, generation of black dots like black sesame (hereinafter called pepper fog) is seen at the unexposed portion, for example, between the dots during halftoning by use of a contact screen in printing sensitive material, whereby a trouble may be caused to occur which can be a vital defect in commercial value. In Japanese Unexamined Patent Publications Nos. 16623/1978 and 20921/1978 as previously mentioned, generation of fog containing pepper fog as mentioned above is inhibited by incorporating benzotriazole which is an inhibitor in the silver halide photographic emulsion, but its effect is not sufficient, and high contrast may be sometimes impaired, and it can hardly be said to be a completed technique.

The present inventors have studied intensively and consequently have developed a light-sensitive silver halide photographic material which does not impair high contrast while inhibiting the fog including pepper fog which is the drawback of the tone hardening technique by use of a hydrazide compound.

SUMMARY OF THE INVENTION

A first object of the present invention is to provide a light-sensitive silver halide photographic material capable of forming a stable image of high contrast by use of a hydrazide compound. A second object of the present invention is to provide a light-sensitive silver halide photographic material with high contrast without generation of fog including pepper fog.

The above objects of the present invention can be accomplished by a light-sensitive silver halide photographic material having a hydrophilic colloid layer containing at least one layer of a light-sensitive silver halide emulsion layer provided on a support, wherein a hydrazide derivative is contained in said light-sensitive silver halide emulsion layer, and the above hydrophilic colloid layer contains at least one of the compounds represented by Formulae [II] and [III] shown below:

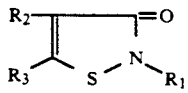

Formula [II]

wherein $R_1$ represents hydrogen atom, a straight or branched alkyl group, a cyclic alkyl group, an alkenyl group, an aralkyl group, an aryl group, a heterocyclic group, an alkylamide group, an arylamide group, an alkylthioamide group, an arylthioamide group, an alkylsulfonamide group or an arylsulfonamide group, $R_2$ and $R_3$ each represent hydrogen atom, a halogen atom, an alkyl group, a cyclic alkyl group, an aryl group, a cyano group, an alkylthio group, an arylthio group, an arylsulfoxide group or an alkylsulfonyl group; with proviso that the above alkyl group, the cylic alkyl group, the alkenyl group, aralkyl group, aryl group and heterocyclic group may have substituent,

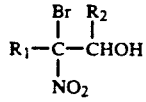

Formula [III]

wherein $R_1$ represents hydrogen atom, a lower alkyl group or a hydroxymethyl group, and $R_2$ represents hydrogen atom or a lower alkyl group.

DESCRIPTION OF THE PREFERRED EMBODIMENTS

In the following, the constitution of the present invention is to be described in detail. The hydrazide derivative to be used in the present invention may include the compounds represented by the following formulae [I -a], [I - b] and [I - c].

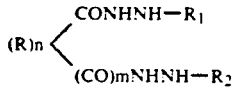

Formula [I-a]

wherein $R_1$ and $R_2$ each represent an aryl group or a heterocyclic group, R represents a divalent organic linking group, n is 0 to 6, m is 0 or 1, and when n is 2 or more, respective R's may be either the same or different).

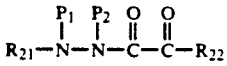

Formula [I-b]

wherein $R_{21}$ represents an aliphatic group, an aromatic group or a heterocyclic group, $R_{22}$ represents hydrogen atom, an alkoxy group which may be substituted, a heterocyclic oxy group, an amino group or an aryloxy group, $P_1$ and $P_2$ each represent hydrogen atom, an acyl group or a sulfinic acid group.

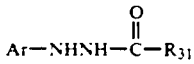

Formula [I-c]

wherein Ar represents an aryl group containing at least one of diffusion resistant group or silver halide adsorption promoting group, and $R_{31}$ represents a substituted alkyl group.

In the following, Formulae [I - a], [I -b] and [I - c] are to be described in more detail below.

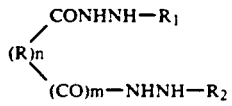

Formula [I-a]

In the formula, $R_1$ and $R_2$ each represent an aryl group or a heterocyclic group, R represents a divalent organic linking group, and n represents 0 to 6 and m represents 0 or 1.

Here, the aryl group represented by $R_1$ and $R_2$ may include phenyl group, naphthyl group, and the heterocyclic group represented by $R_1$ and $R_2$ may include pyridyl group, benzothiazolyl group, quinolyl group, thienyl group, etc., but $R_1$ and $R_2$ may be preferably aryl groups. The aryl group or heterocyclic group represented by $R_1$ and $R_2$ can introduce various substituents therein. Examples of substituents may include halogen atoms (e.g. chlorine, fluorine, etc.) alkyl groups (e.g. methyl, ethyl, dodecyl, etc.), alkoxy groups (e.g. methoxy, ethoxy, isopropoxy, butoxy, octyloxy, dodecyloxy, etc.), acylamino groups (e.g. acetylamino, pivalylamino, benzoylamino, tetradecanoylamino, α-(2,4-di-t-amylphenoxy) butyrylamino, etc.), sulfonylamino groups (e.g. methanesulfonylamino, butanesulfonylamino, dodecanesulfonylamino, benzenesulfonylamino, etc.), urea groups (e.g. phenylurea, ethylurea, etc.), thiourea groups (e.g. phenylthiourea, ethylthiourea, etc.), hydroxy group, amino group, alkylamino groups (e.g. methylamino, dimethylamino, etc.), carboxy group, alkoxycarbonyl groups (e.g. ethoxycarbonyl), carbamoyl group, sulfo group and so on. Examples of the divalent organic linking group represented by R may include alkylene groups (e.g. methylene, ethylene, trimethylene, tetramethylene, etc.), arylene groups (e.g. phenylene, naphthylene, etc.), aralkylene groups, etc., and the alkylene group may contain oxy group, thio group,seleno group, carbonyl group,

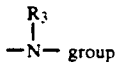

($R_3$ represents hydrogen atom, an alkyl group, an aryl group), sulfonyl group, etc. in the bond. Into the group represented by R can be introduced various substituents.

Examples of substituents may include —$CONHNHR_4$ ($R_4$ has the same meaning as $R_1$ and $R_2$ as described above), alkyl groups, alkoxy groups, halogen atoms, hydroxy group, carboxy group, acyl groups, aryl groups, etc.

R may be preferably a alkylene group.

Of the compounds represented by Formula [I - a], preferable are compounds wherein $R_1$ and $R_2$ are substituted or unsubstituted phenyl groups, n=m=1 and R represents an alkylene group.

Representative compounds represented by the above Formula [I - a] are shown below.

Specific compounds

I-a-1

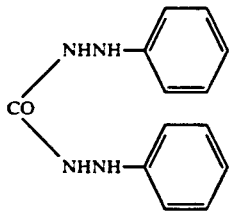

I-a-2

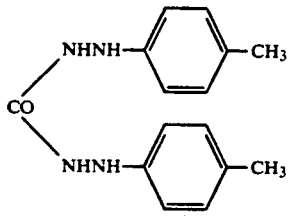

I-a-3

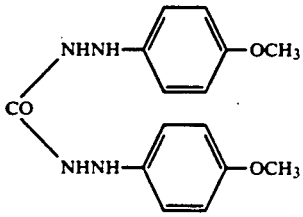

I-a-4

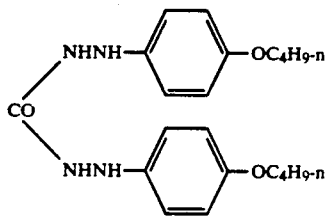

-continued
Specific compounds
I-a-5
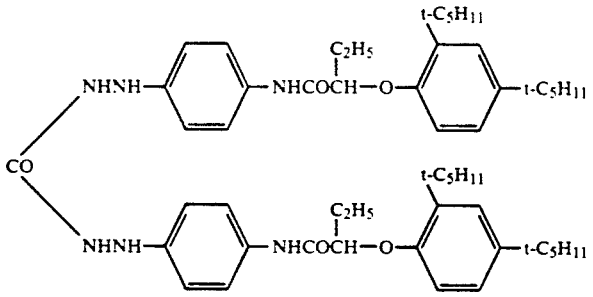
I-a-6
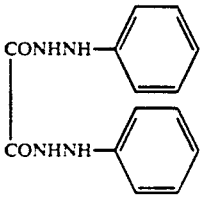
I-a-7
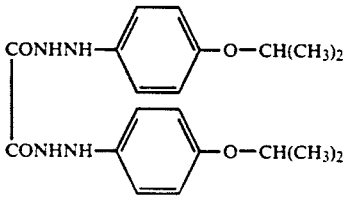
I-a-8
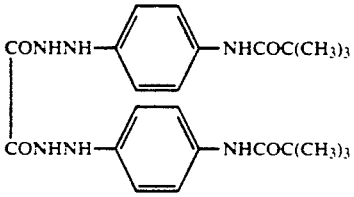
I-a-9
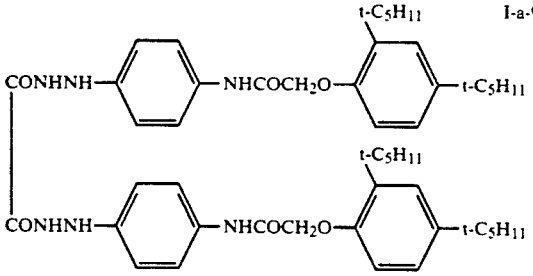
I-a-10
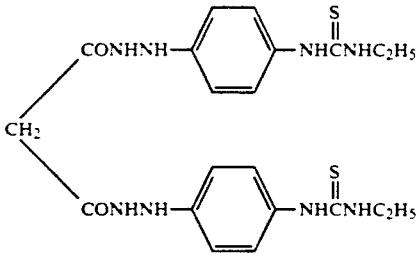
I-a-11
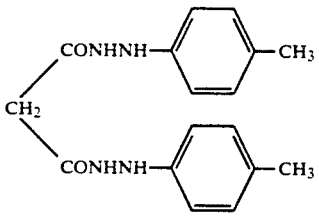
I-a-12
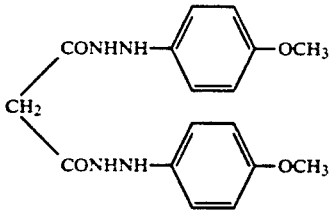
I-a-13
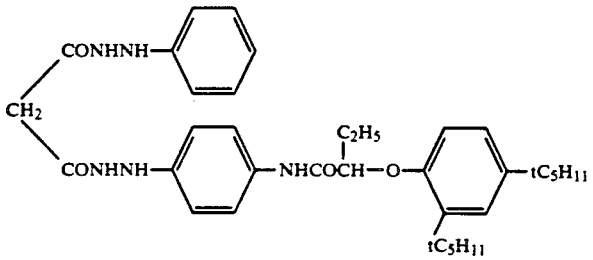

-continued
Specific compounds
I-a-14
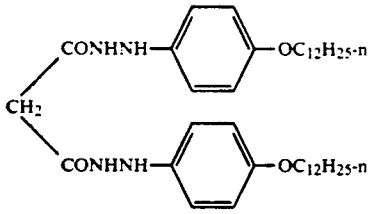
I-a-15
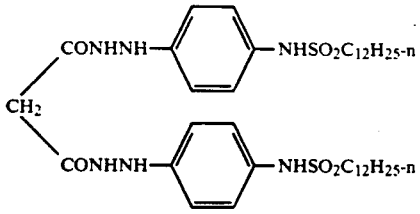
I-a-16
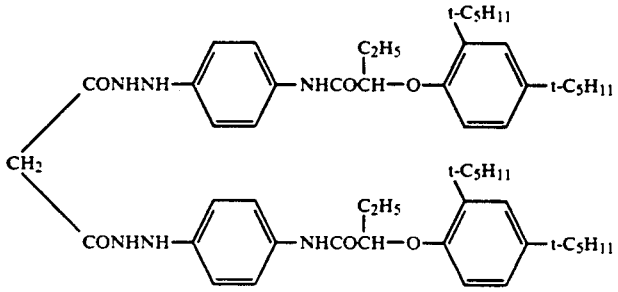
I-a-17
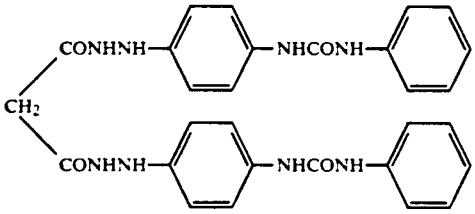
I-a-18
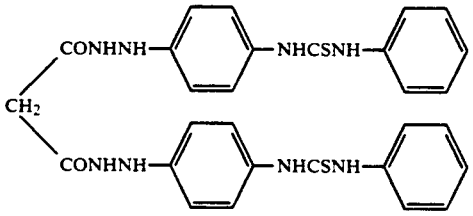
I-a-19
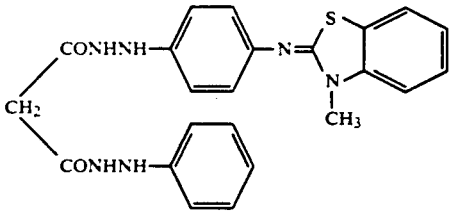
I-a-20
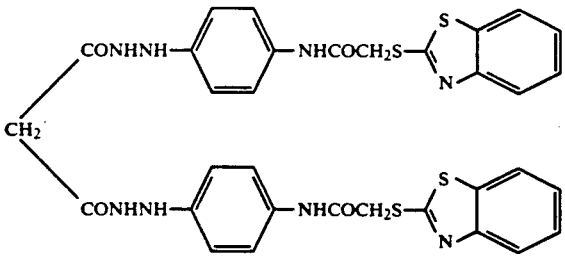
I-a-21
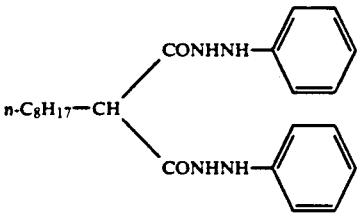
I-a-22
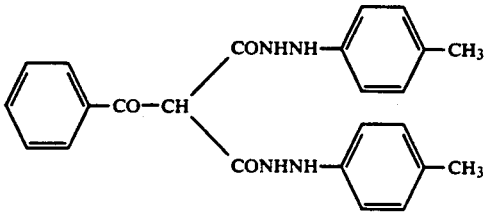

-continued
Specific compounds
I-a-23
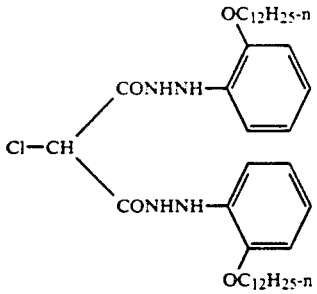
I-a-24
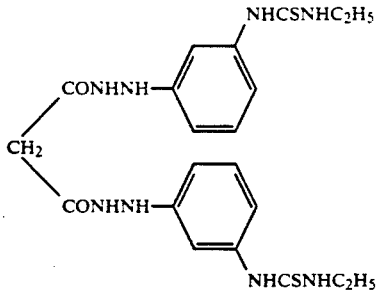
I-a-25
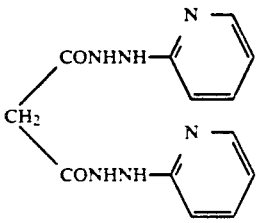
I-a-26
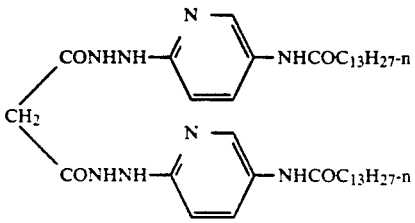
I-a-27
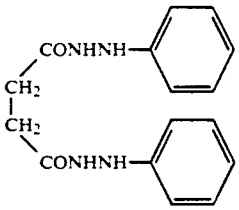
I-a-28
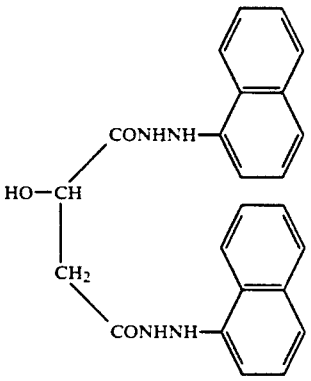
I-a-29
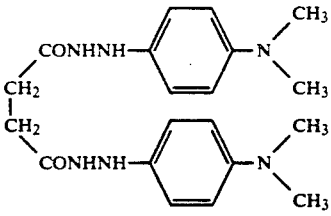
I-a-30
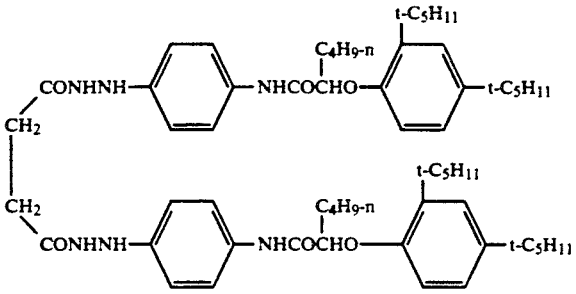

-continued
Specific compounds
I-a-31
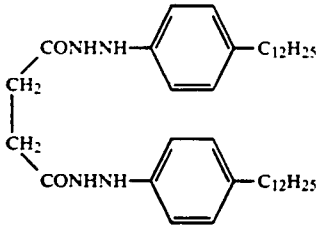
I-a-32
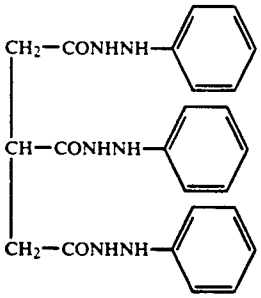
I-a-33
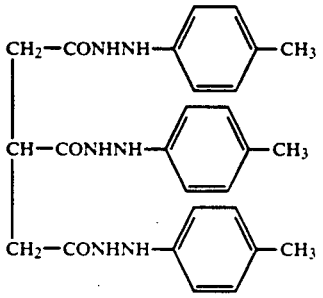
I-a-34
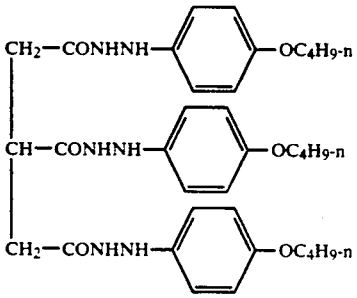
I-a-35
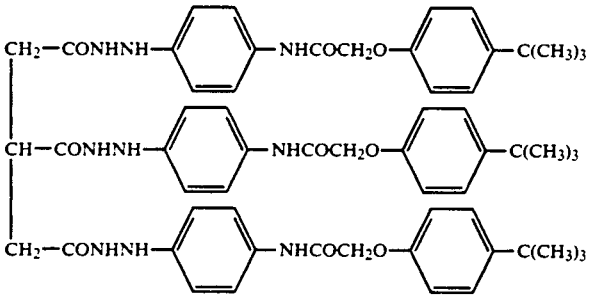
I-a-36
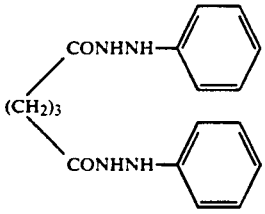
I-a-37
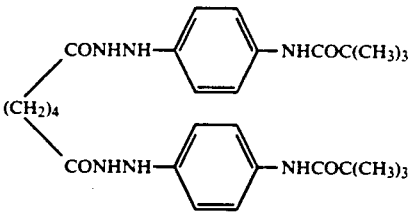
I-a-38
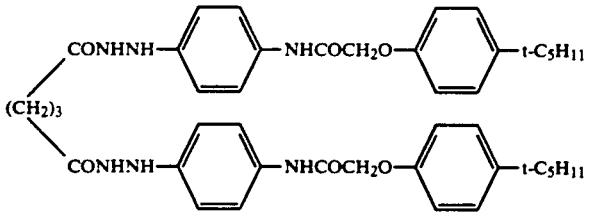
I-a-39
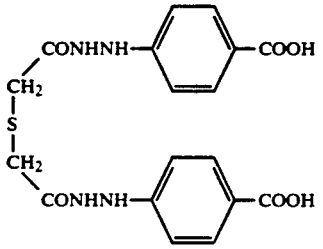
I-a-40
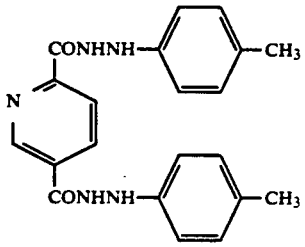

-continued
Specific compounds
I-a-41
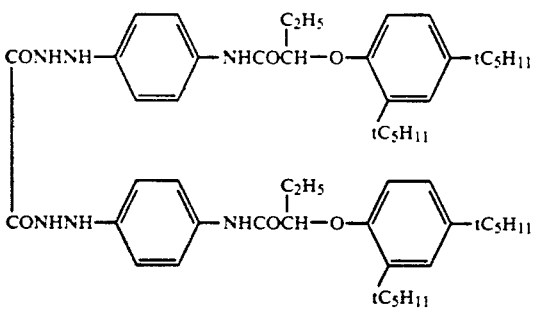
I-a-42
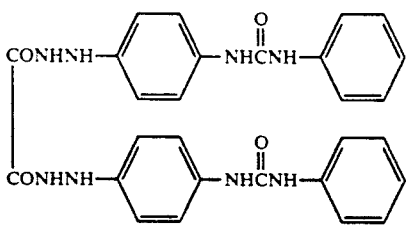
I-a-43
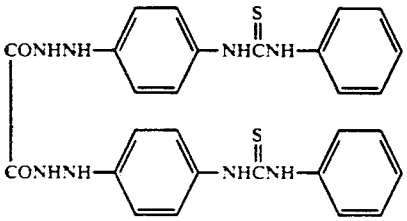
I-a-44
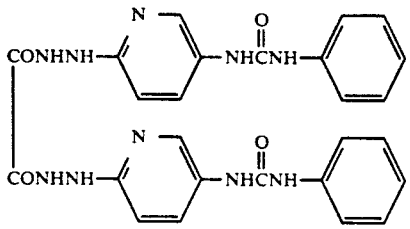
I-a-45
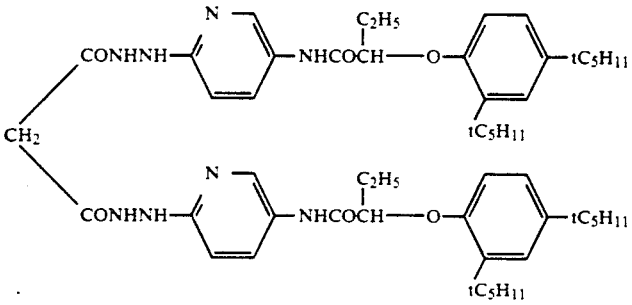
I-a-46
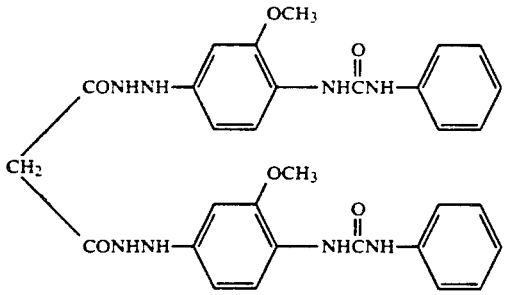
I-a-47
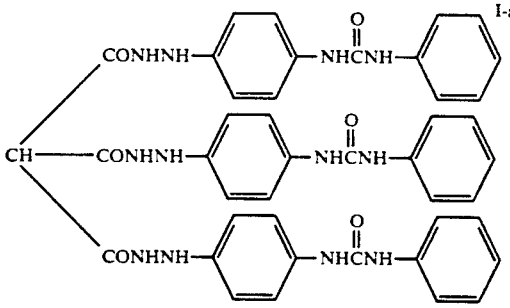
I-a-48
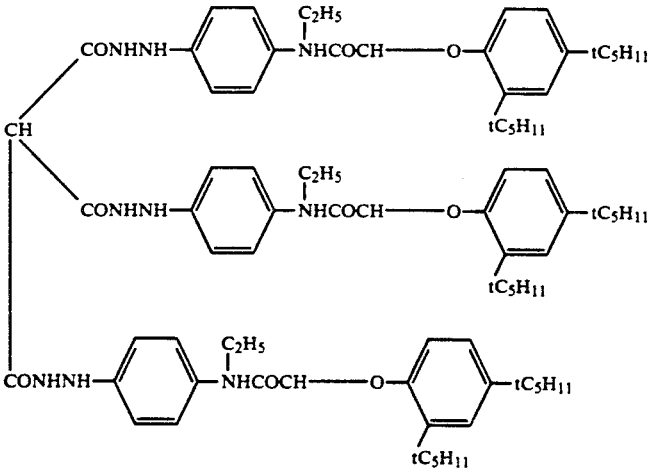

-continued
Specific compounds
I-a-49
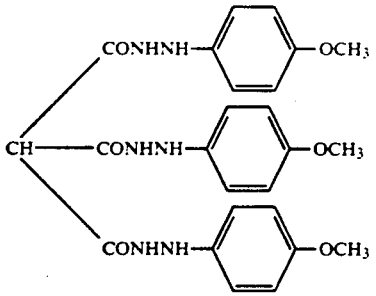
I-a-50
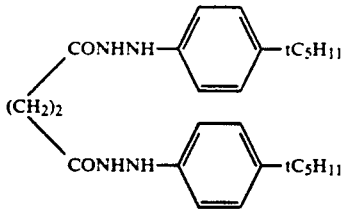
I-a-51
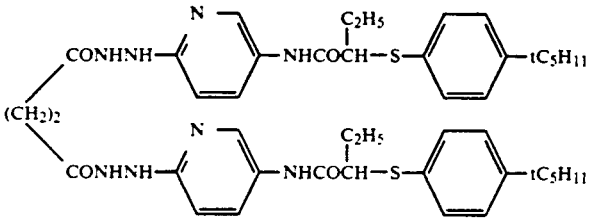
I-a-52
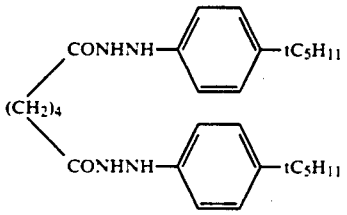
I-a-53
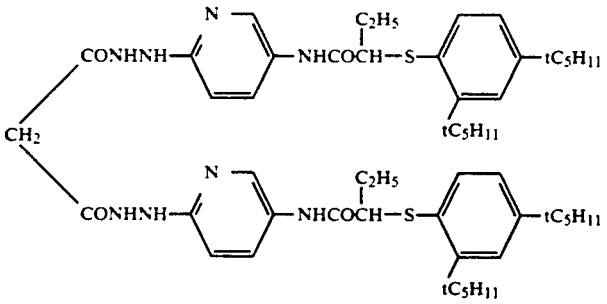
I-a-54
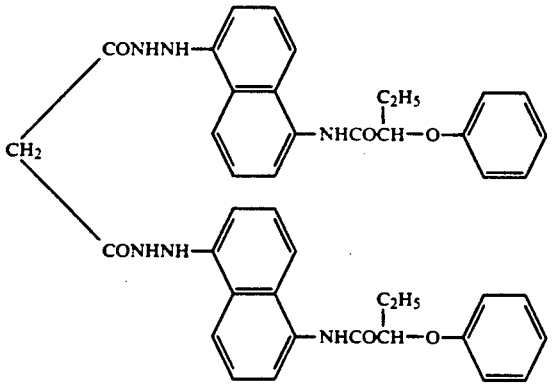

-continued

Specific compounds

I-a-55

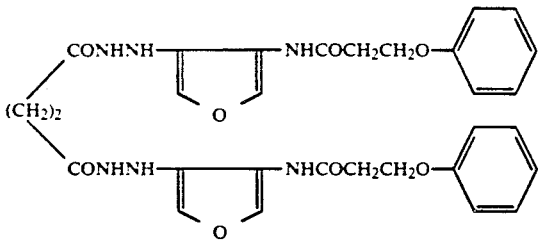

I-a-56

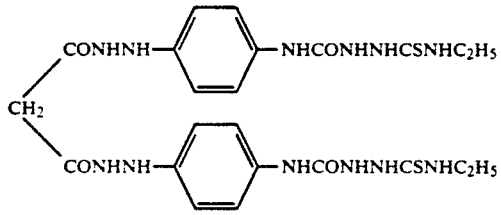

I-a-57

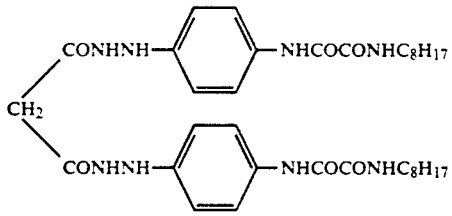

I-a-58

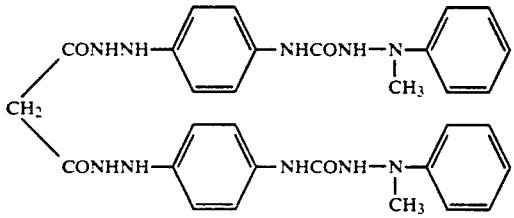

In the following, Formula [I - b] is to be described.

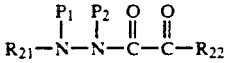

The aliphatic group represented by $R_{21}$ may be preferably one having 6 or more carbon atoms, particularly a straight, branched or cyclic alkyl group having 8 to 50 carbon atoms. Here, the branched alkyl group may be cyclized so as to form a saturated hetero ring containing one or more hetero atoms. The alkyl group may have substituent such as aryl group, alkoxy group, sulfoxy group, etc.

The aromatic group represented by $R_{21}$ is a monocyclic or bicyclic aryl group or unsaturated heterocyclic group. Here, the unsaturated heterocyclic group may be condensed with the monocyclic or bicyclic group to form a heteroaryl group.

For example, there may be included benzene ring, naphthalene ring, pyridine ring, pyrimidine group, imidazole ring, pyrazole ring, quinoline ring, isoquinoline ring, benzimidazole ring, thiazole ring, benzothiazole ring, etc., but amount them those containing benzene ring are preferred.

As $R_{22}$, particularly preferred is an aryl group.

The aryl group or unsaturated heterocyclic group represented by $R_{21}$ may be substituted, and representative substituents may include straight, branched or cyclic alkyl groups (preferably monocyclic or bicyclic ones with an alkyl moiety having 1 to 20 carbon atoms), alkoxy groups (having preferably 1 to 20 carbon atoms), substituted amino groups (preferably amino groups substituted with alkyl groups having 1 to 20 carbon atoms), acylamino groups (having preferably 2 to 30 carbon atoms), sulfonamide groups (having preferably 1 to 30 carbon atoms), ureido groups (having preferably 1 to 30 carbon atoms) and others.

Of the groups represented by $R_{22}$ in the formula [I - b], the alkoxy group which may be substituted may have 1 to 20 carbon atoms and may be substituted with halogen atoms, aryl groups, etc.

Of the groups represented by $R_{22}$ in the formula [I - b], the aryloxy group or the heterocyclic oxy group which may be also substituted may be preferably monocyclic, and the substituent may include halogen atoms, alkyl groups, alkoxy group, cyano group, etc.

Of the groups represented by $R_{22}$, preferable are alkoxy groups or amino groups which may be also substituted.

In the case of an amino group, $A_1$ and $A_2$ in the group

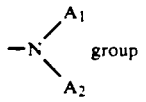

may be an alkyl group, alkoxy group which may be substituted, or a cyclic structure containing —O—, —S—, —N— group bond. However, $R_{22}$ cannot be hydrazino group.

$R_{21}$ or $R_{22}$ in Formula [I - b] may be one having a ballast group conventionally used in the immobile additive for photography such as coupler, etc. incorporated therein. The ballast group is a group having 8 or more carbon atoms relatively inert to photographic characteristic, and can be chosen from, for example, alkyl groups, alkoxy groups, phenyl groups, alkylphenyl groups, phenoxy groups, alkylphenoxy groups, etc.

$R_{21}$ or $R_{22}$ in Formula [I - b] may be also one having a group for strengthening adsorption to the surface of silver halide grains incorporated therein. As such adsorptive groups, there may be included the groups as disclosed in U.S. Pat. No. 4,355,105 such as thiourea group, heterocyclic thioamide group, mercaptoheterocyclic group, triazole group, etc. Among the compounds represented by the group [I - b], the compounds represented by Formula [I - b - a] are particularly preferable.

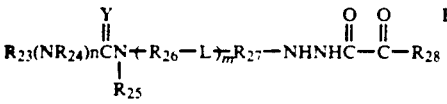

Formula [I-b-a]

In the Formula [I - b - a], $R_{23}$ and $R_{24}$ each represent hydrogen atom, an alkyl group which may be substituted (e.g. methyl, ethyl, butyl, dodecyl, 2-hydroxypropyl, 2-cyanoethyl, 2-chloroethyl group), a phenyl, naphthyl, cyclohexyl, pyridyl, pyrrolidyl group which may be substituted (e.g. phenyl, p-methylphenyl, naphthyl, α-hydroxynaphthyl, cyclohexyl, p-methylcyclohexyl, pyridyl, 4-propyl-2-pyridyl, pyrrolidyl, 4-methyl-2-pyrrolidyl group);

$R_{25}$ represents hydrogen atom or a benzyl, alkoxy and alkyl group which may be substituted (e.g. benzyl, p-methylbenzyl, methoxy, ethoxy, ethyl, butyl group);

$R_{26}$ and $R_{27}$ each represent a divalent aromatic group (e.g. phenylene or naphthylene group), Y represents sulfur atoms or oxygen atom, L represents a divalent linking group (e.g. $—SO_2CH_2CH_2NH—SO_2NH—$, $—OCH_2SO_2NH—$, —O—, —CH=N—);

$R_{28}$ represents —NR'R" or $—OR_{29}$;

R', R" and $R_{29}$ each represent hydrogen atom, an alkyl group which may be substituted (e.g. methyl, ethyl, dodecyl group), a phenyl group which may be substituted (e.g. phenyl, p-methylphenyl, p-methoxyphenyl group) or a naphthyl group which may be substituted (e.g. α-naphthyl group, β-naphthyl group), m, n represent 0 or 1, and when $R_{28}$ represents $OR_{29}$, Y should preferably represent sulfur atom.

Represenatative compounds represented by the above Formulae [I - b] and [I - b - a] are shown below.

Specific compounds of Formula [I-b]:

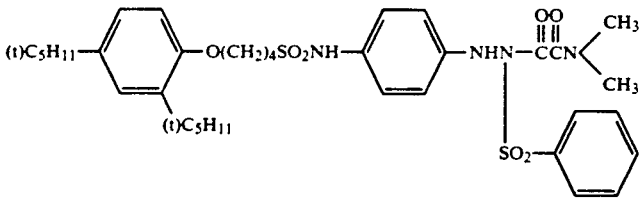

I-b-1

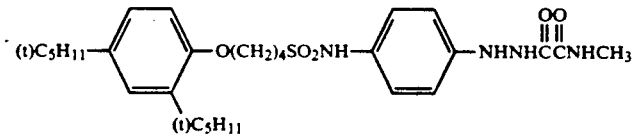

I-b-2

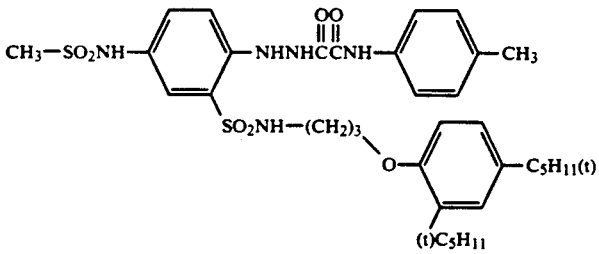

I-b-3

-continued
I-b-4
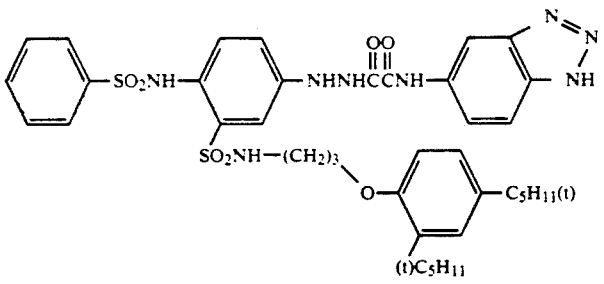
I-b-5
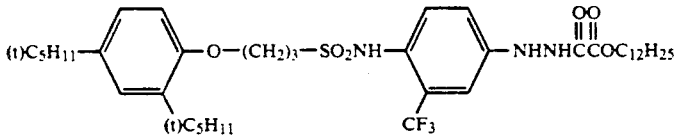
I-b-6
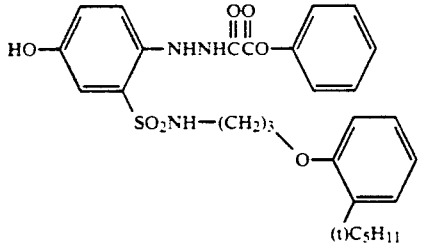
I-b-7
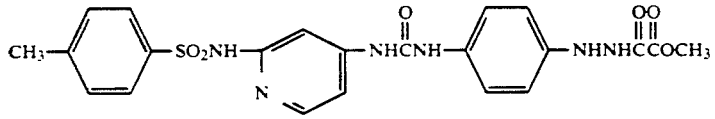
I-b-8
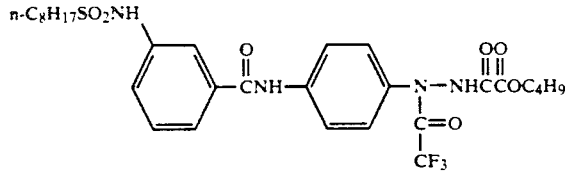
I-b-9
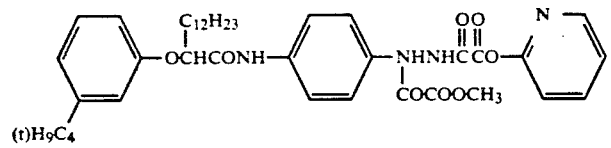
I-b-10
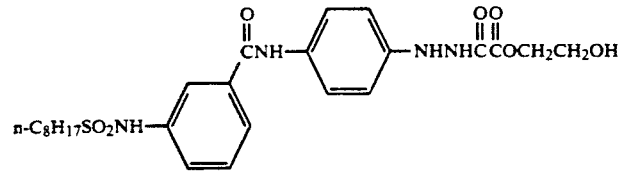
I-b-11
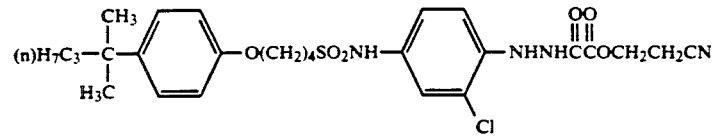

-continued
I-b-12
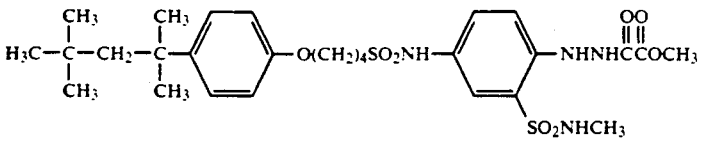
I-b-13
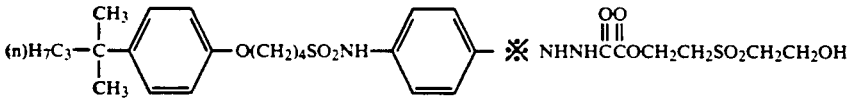
I-b-14
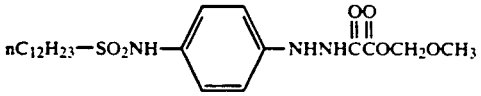
I-b-15
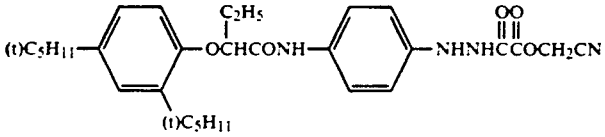
I-b-16
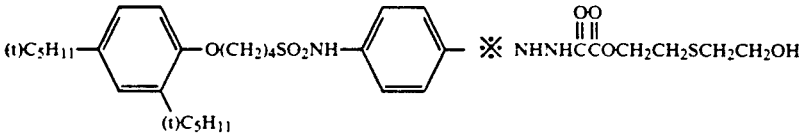
I-b-17
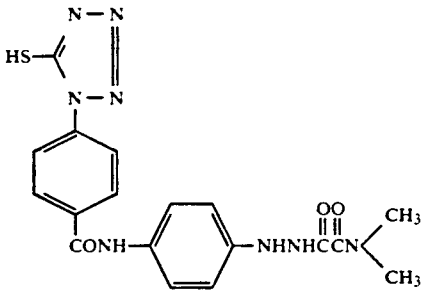
I-b-18
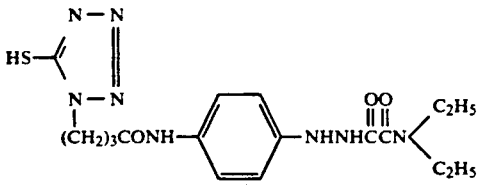
I-b-19
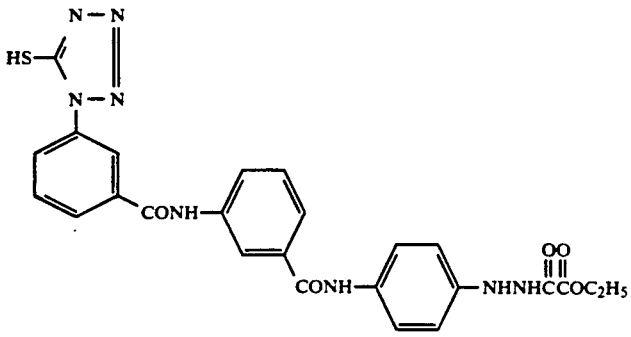

-continued
I-b-20
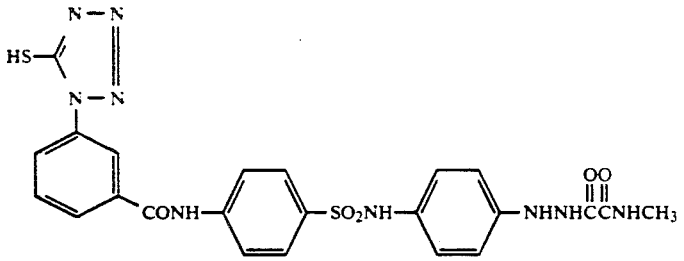
I-b-21
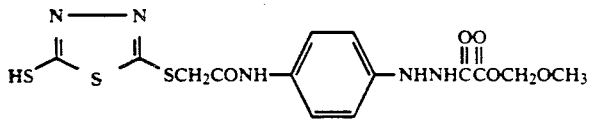
I-b-22
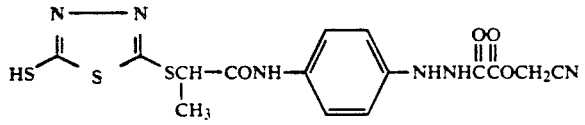
I-b-23
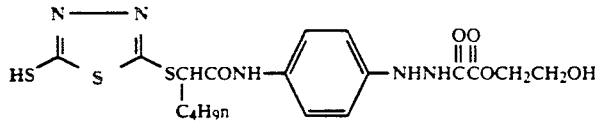
I-b-24
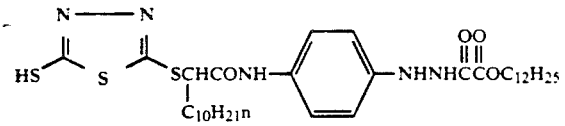
I-b-25
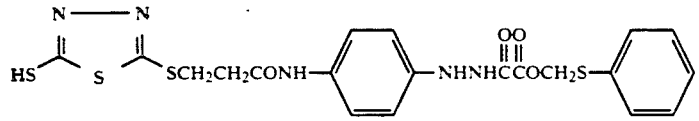
I-b-26
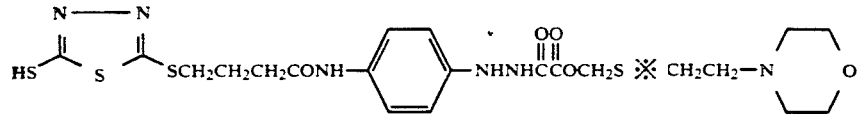
I-b-27
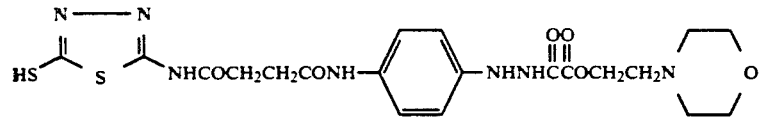
I-b-28
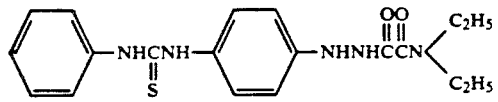
I-b-29
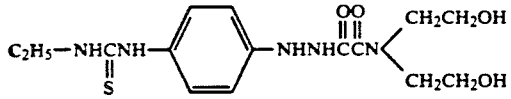
I-b-30
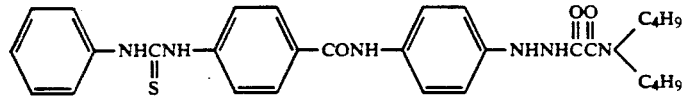

-continued
I-b-31
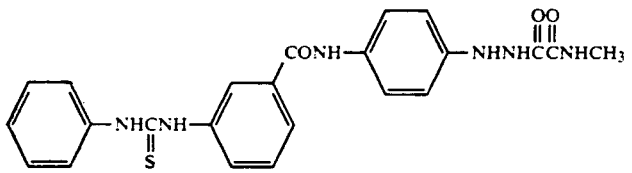
I-b-32
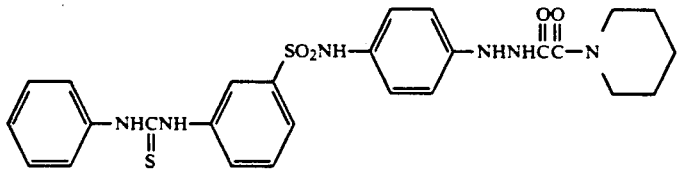
I-b-33
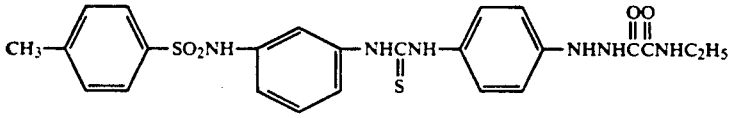
I-b-34
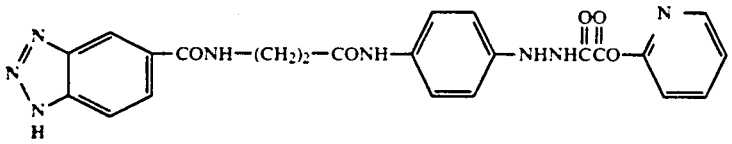
I-b-35
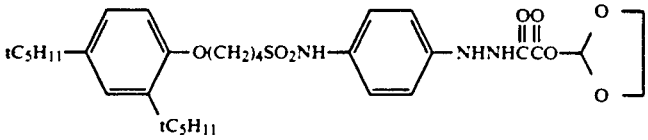
I-b-36
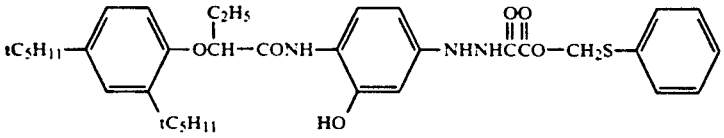
I-b-37
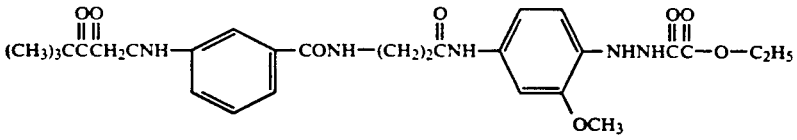
I-b-38
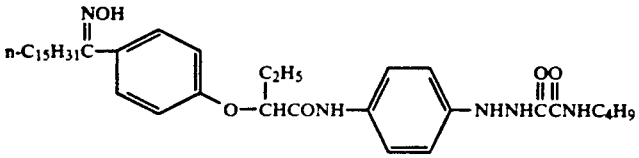
I-b-39
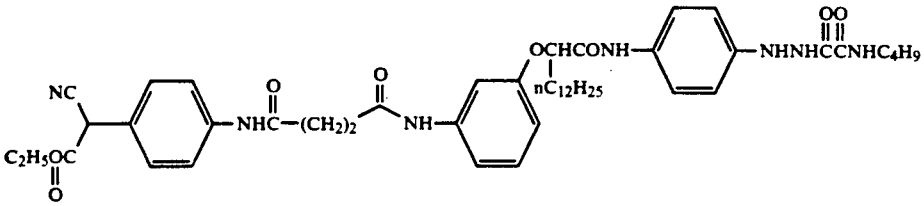

-continued
I-b-40
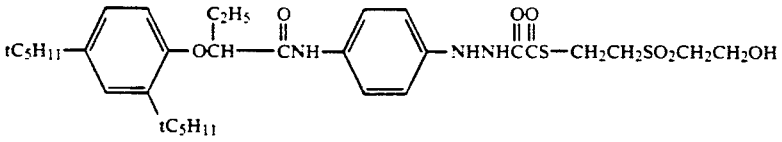
I-b-41
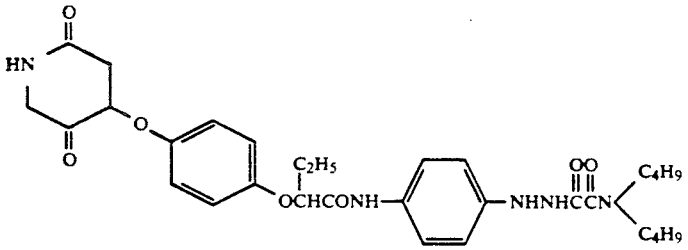
I-b-42
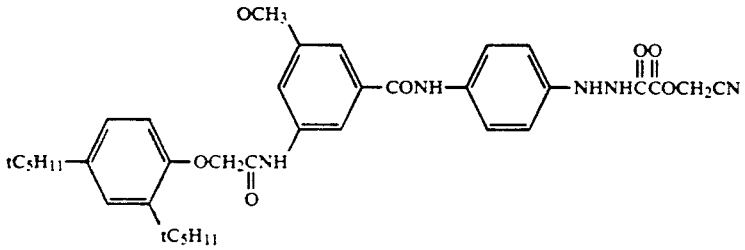
I-b-43
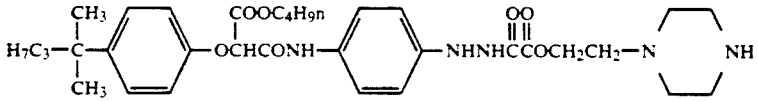
I-b-44
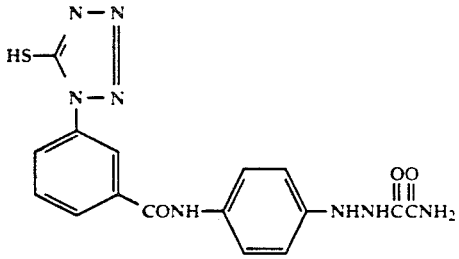
I-b-45
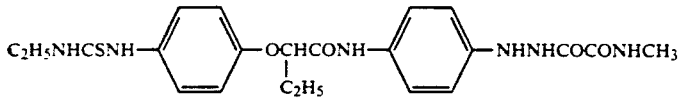
I-b-46
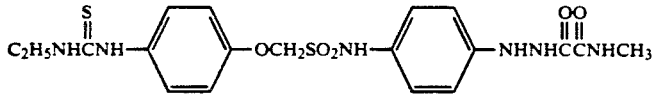
I-b-47
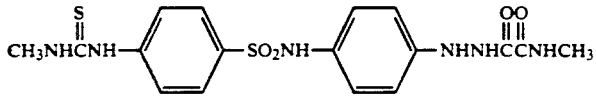
I-b-48
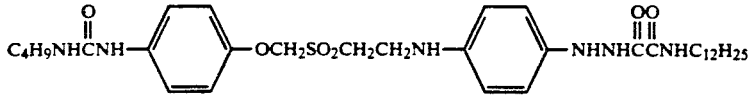
I-b-49
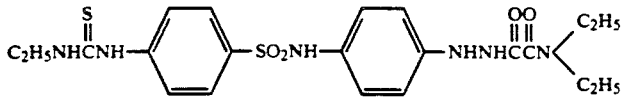

-continued
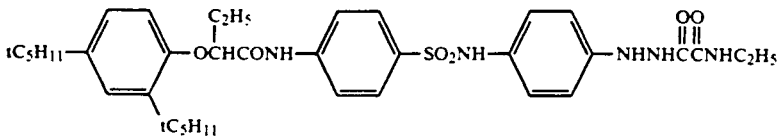
I-b-50
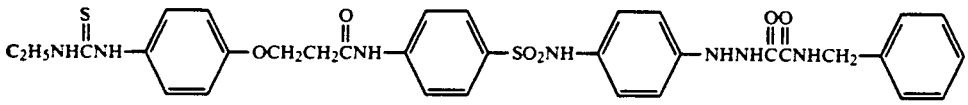
I-b-51
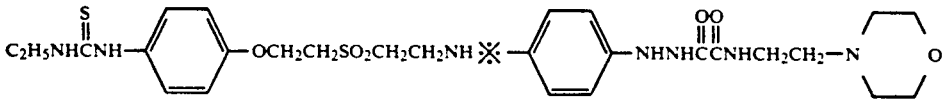
I-b-52
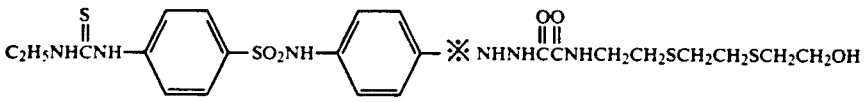
I-b-53
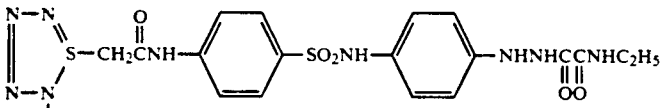
I-b-54
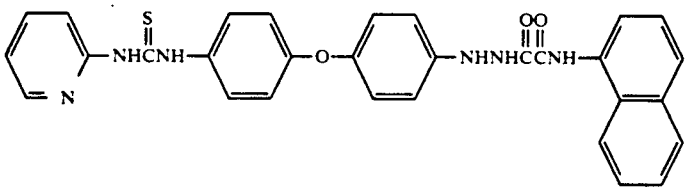
I-b-55
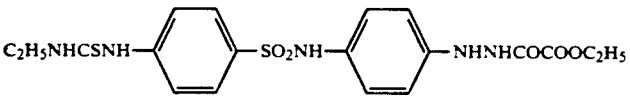
I-b-56
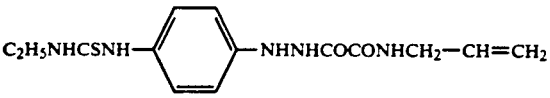
I-b-57
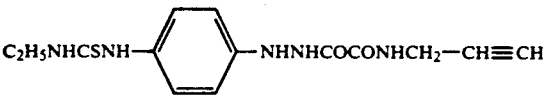
I-b-58
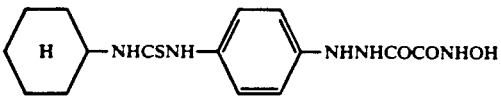
I-b-59
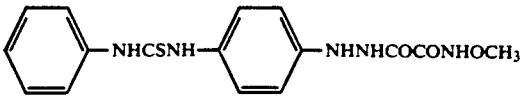
I-b-60

-continued
I-b-61
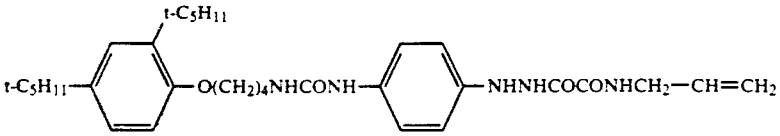
I-b-62
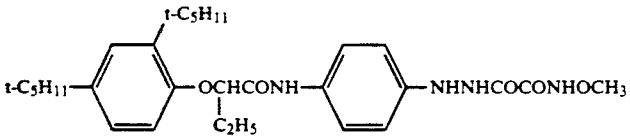
I-b-63
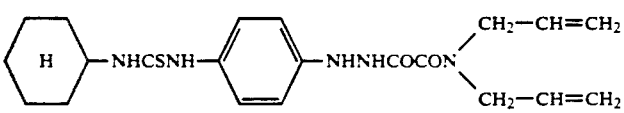
I-b-64
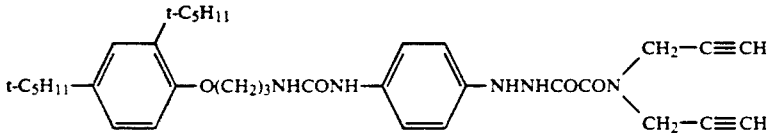
I-b-65
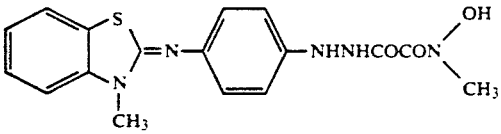
I-b-66
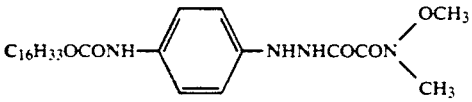
I-b-67
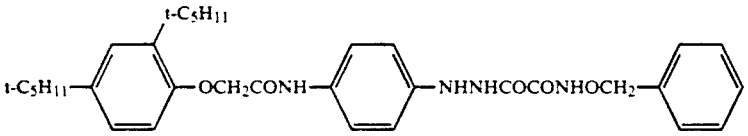
I-b-68
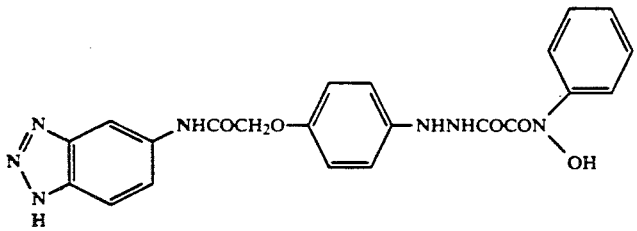
I-b-69
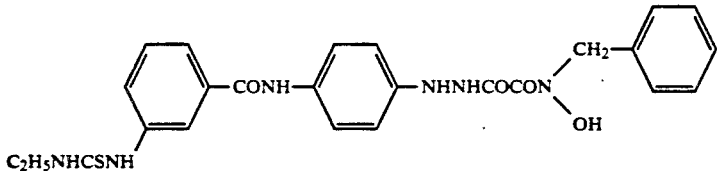
I-b-70
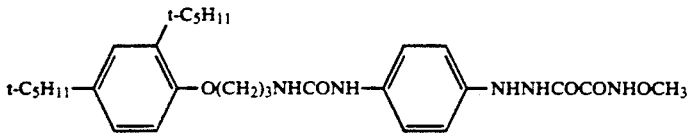

-continued
I-b-71
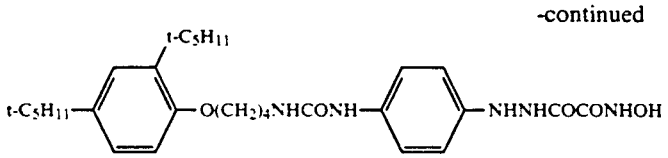
I-b-72
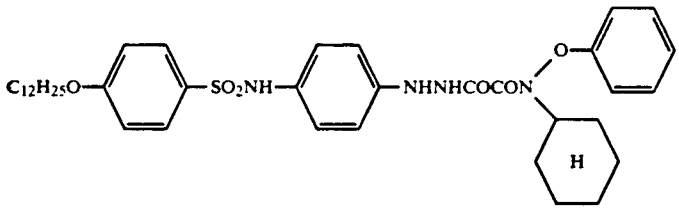
I-b-73
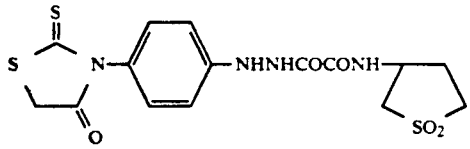
I-b-74
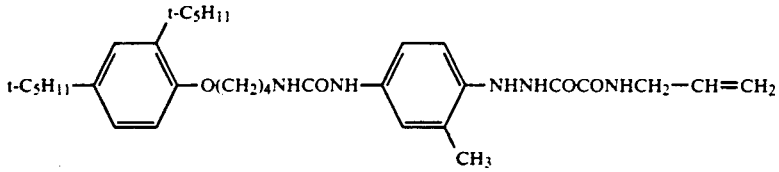
I-b-75
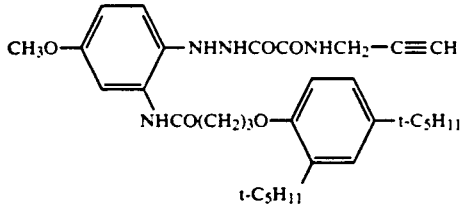
I-b-76
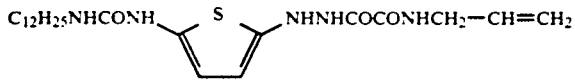
I-b-77
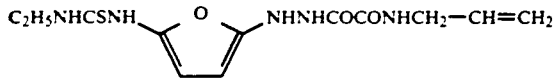
I-b-78
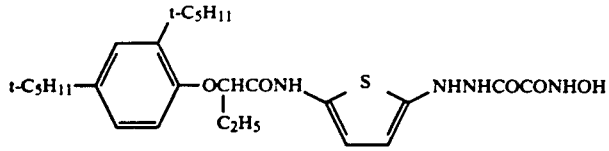
I-b-79
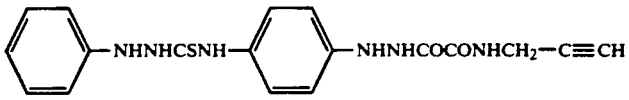
I-b-80
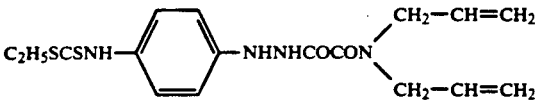
I-b-81
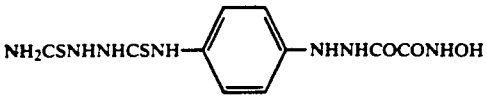

-continued
I-b-82
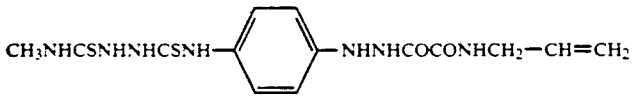
I-b-83
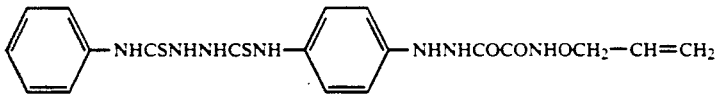
I-b-84
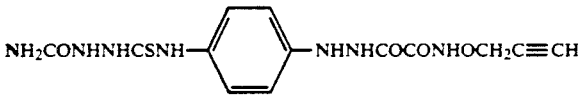
I-b-85
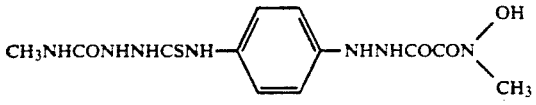
I-b-86
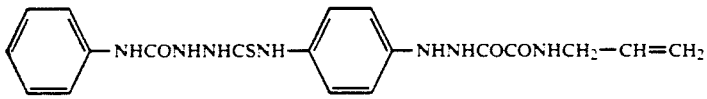
I-b-87
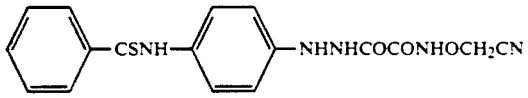
I-b-88
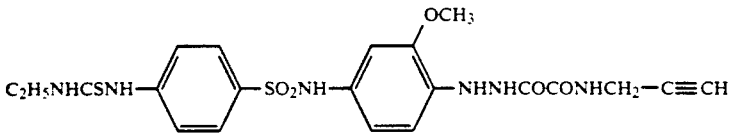
I-b-89
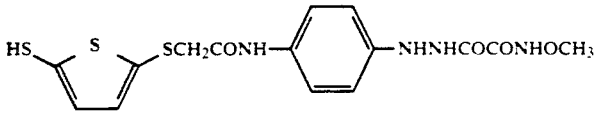
I-b-90
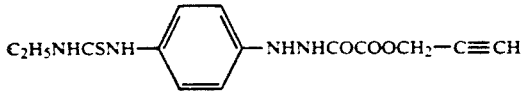
I-b-91
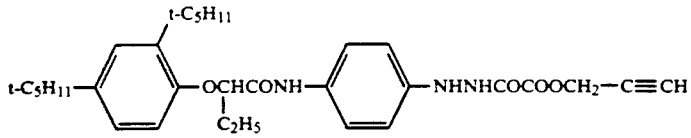
I-b-92
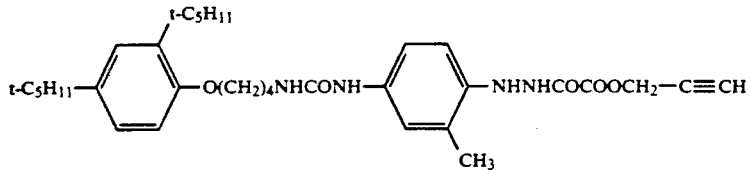
I-b-93
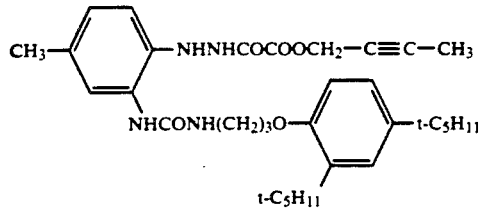

-continued
I-b-94
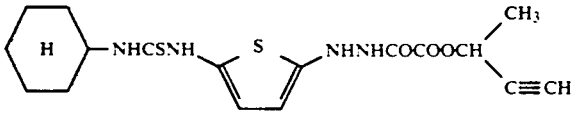
I-b-95
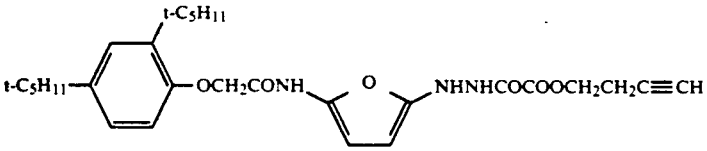
I-b-96
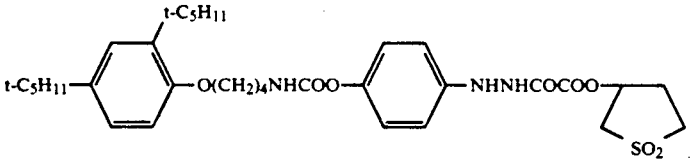
I-b-97
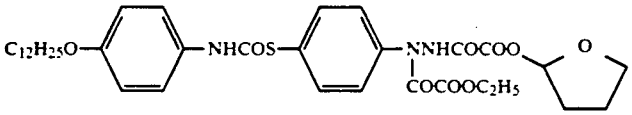
I-b-98
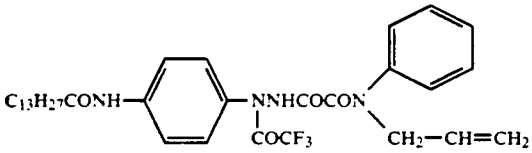
I-b-99
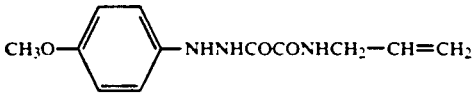
I-b-100
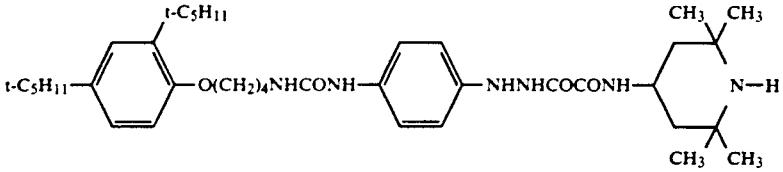
I-b-101
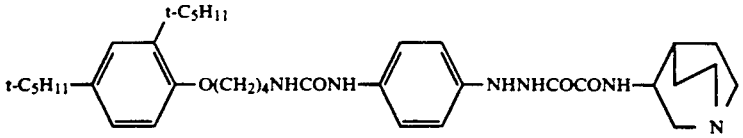
I-b-102
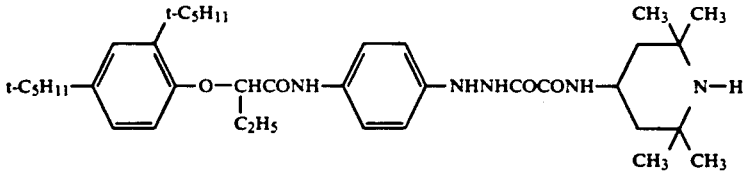
I-b-103
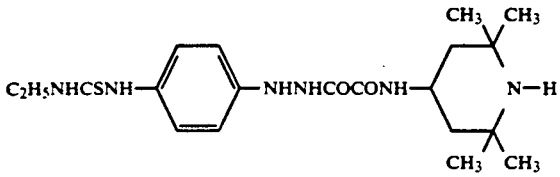

-continued
I-b-104
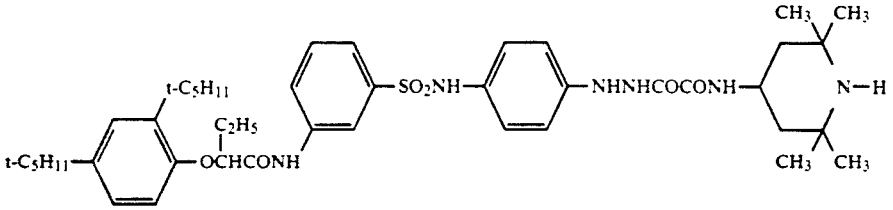
I-b-105
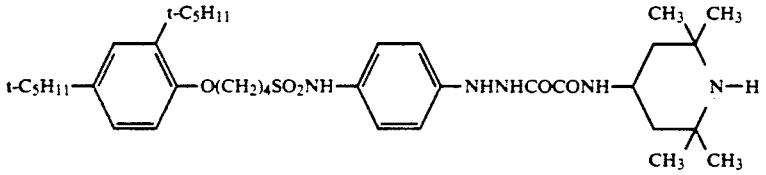
I-b-106
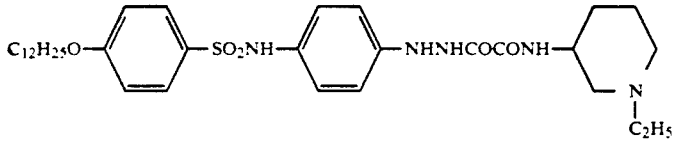
I-b-107
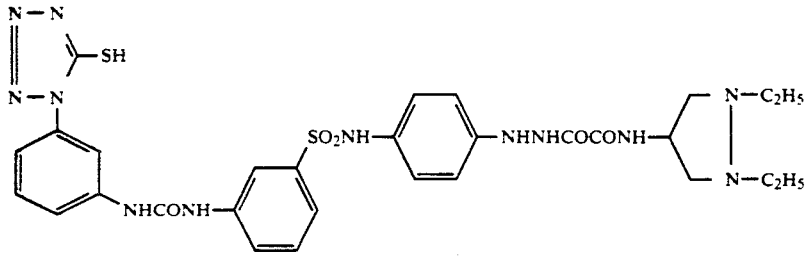
I-b-108
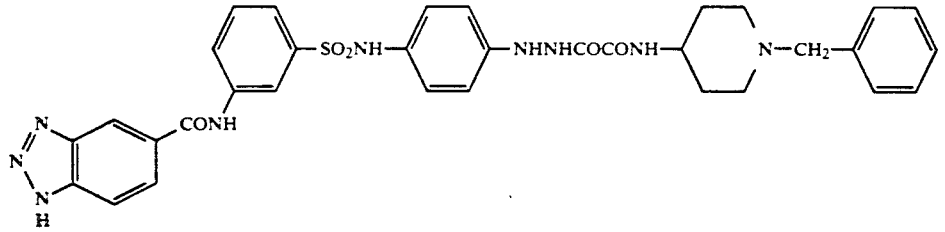
I-b-109
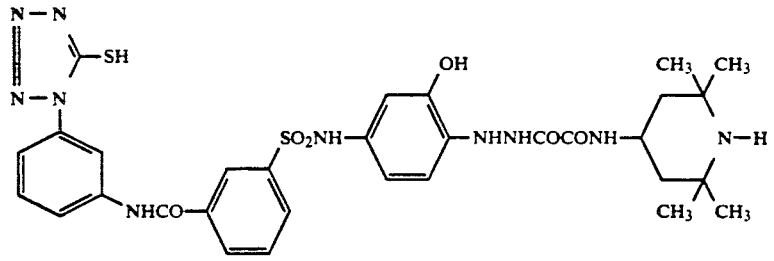
I-b-110
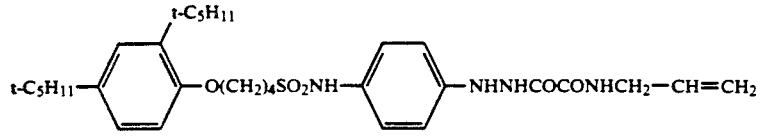

-continued
I-b-111
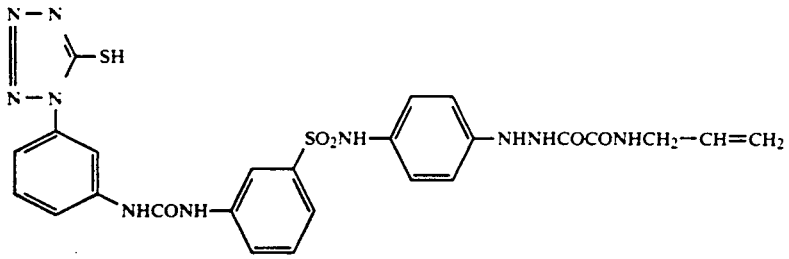
I-b-112
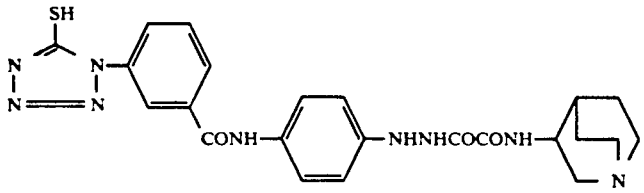
I-b-113
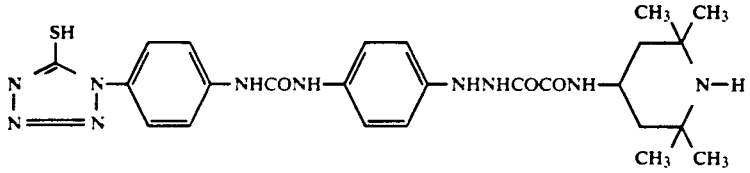
I-b-114
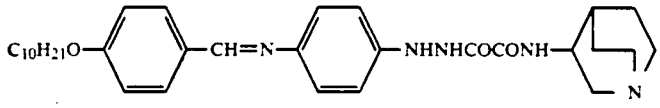
I-b-115
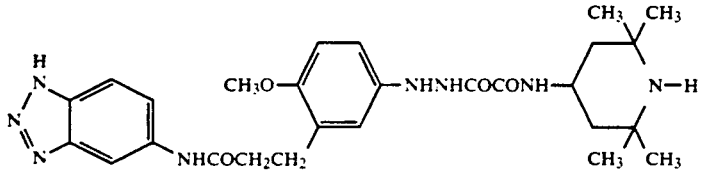
I-b-116
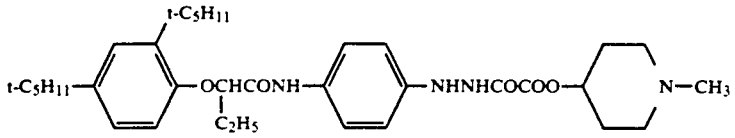
I-b-117
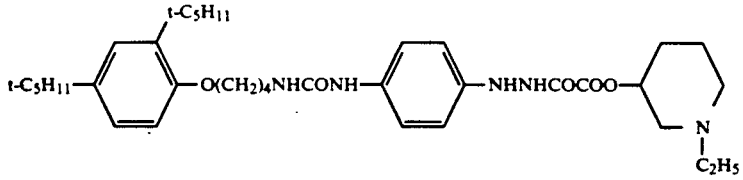
I-b-118
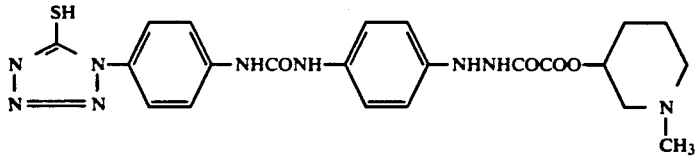
I-b-119
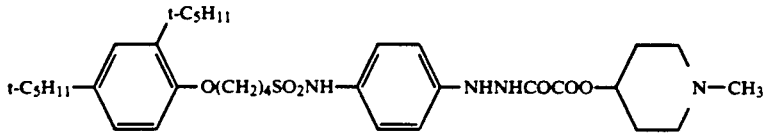

-continued
I-b-119
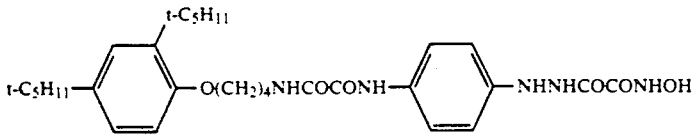
I-b-120
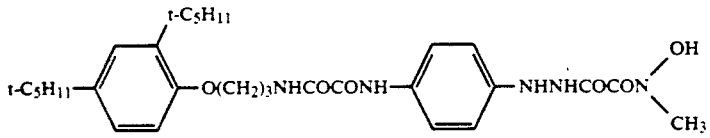
I-b-121
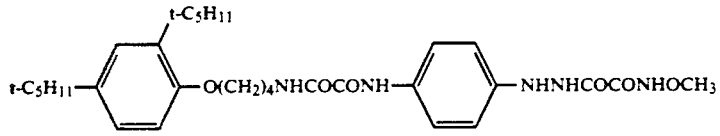
I-b-122
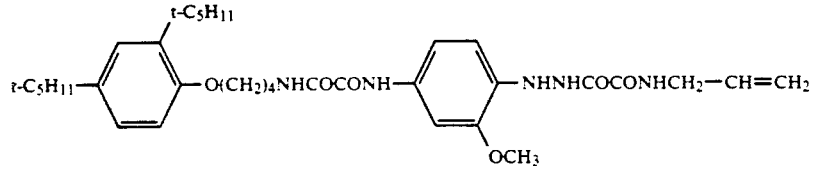
I-b-123
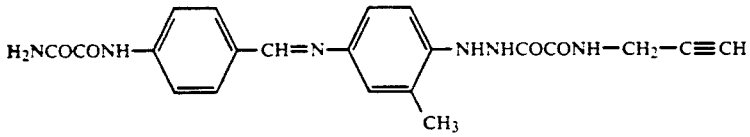
I-b-124
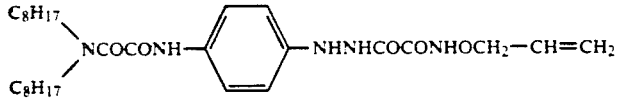
I-b-125
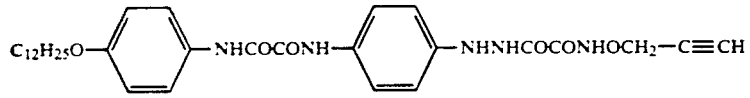
I-b-126
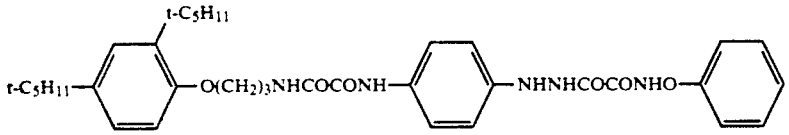
I-b-127
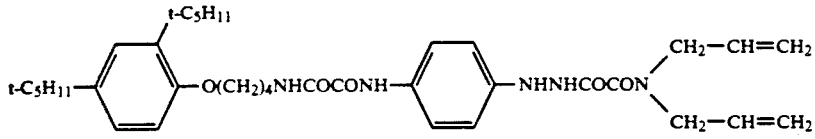
I-b-128
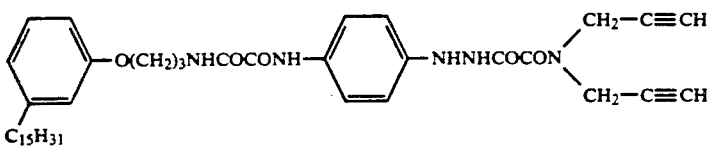
I-b-129
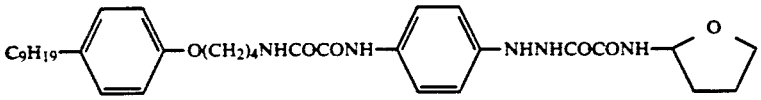

-continued
I-b-130
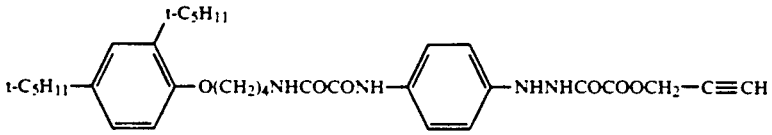
I-b-131
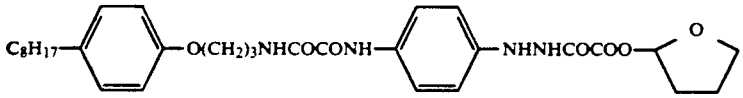
I-b-132
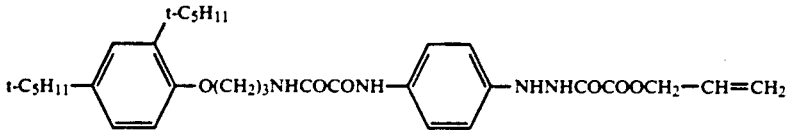
I-b-133
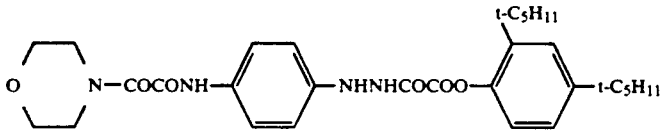
I-b-134
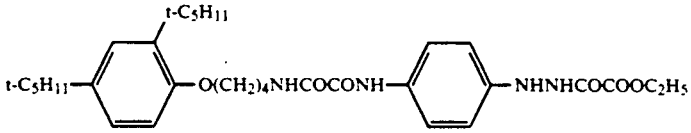
I-b-135
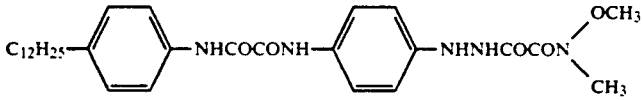
I-b-136
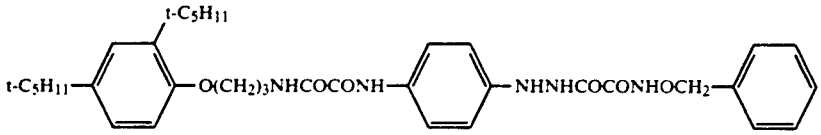
I-b-137
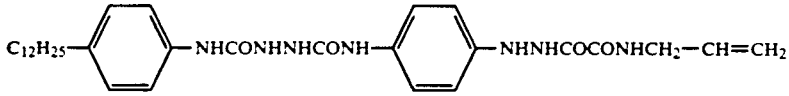
I-b-138
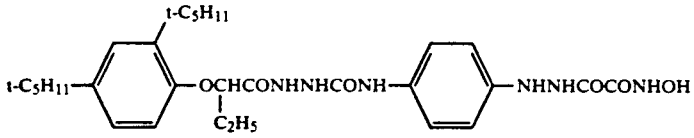
I-b-139
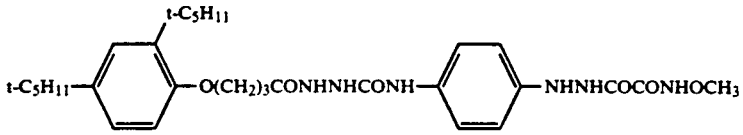
I-b-140
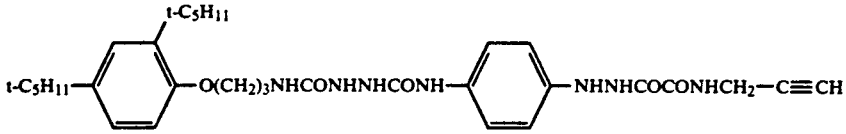
I-b-141
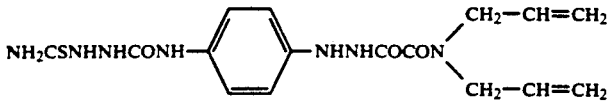

-continued
I-b-142
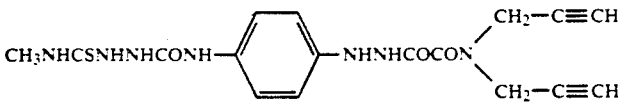
I-b-143
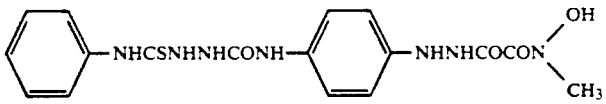
I-b-144
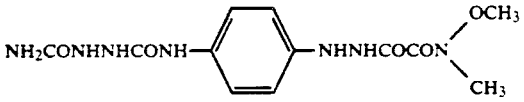
I-b-145
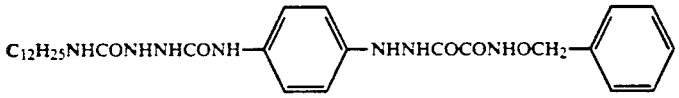
I-b-146
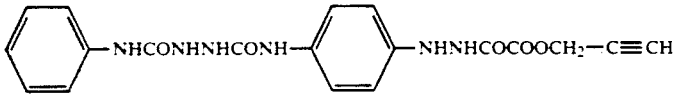
I-b-147
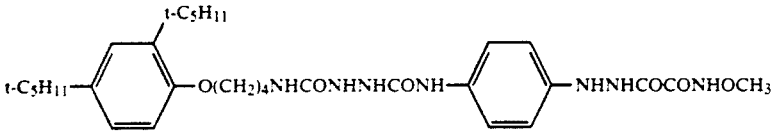
I-b-148
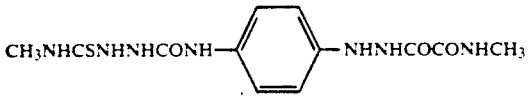
I-b-149
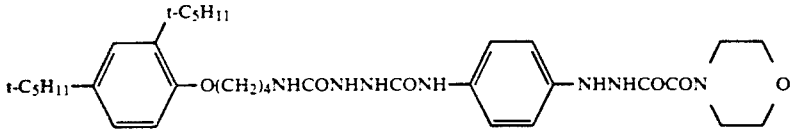
I-b-150
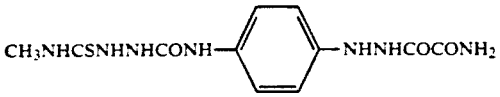
I-b-151
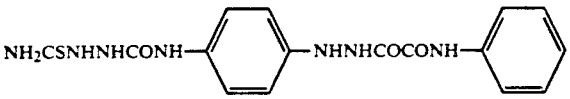
I-b-152
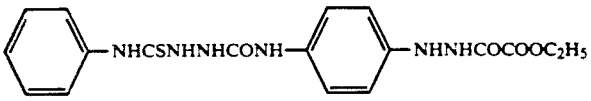
I-b-153
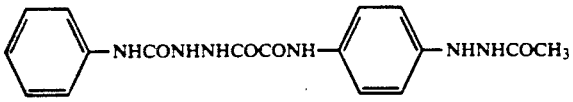
I-b-154
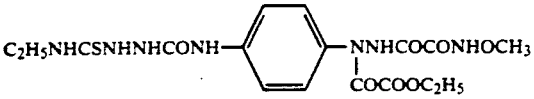

-continued
I-b-155
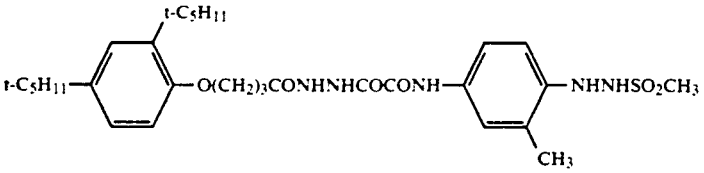
I-b-156
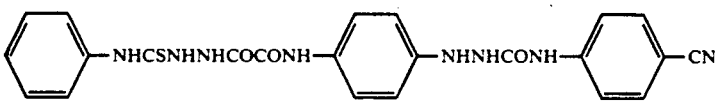
I-b-157
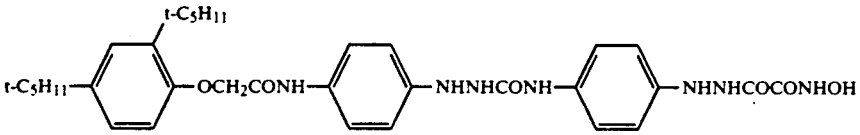
I-b-158
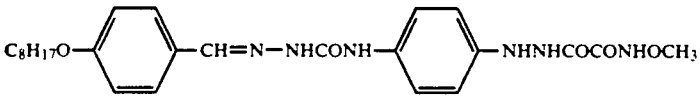
I-b-159
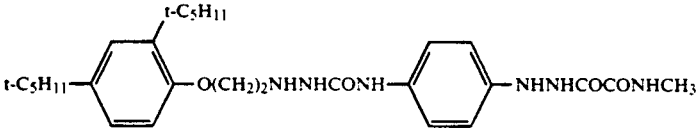
I-b-160
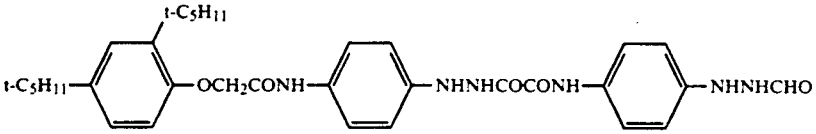
I-b-161
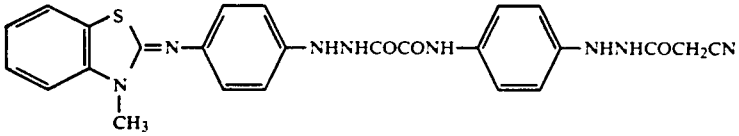
I-b-162
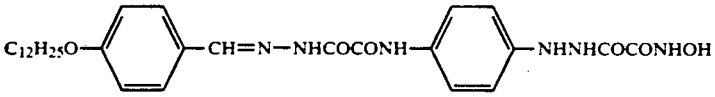
I-b-163
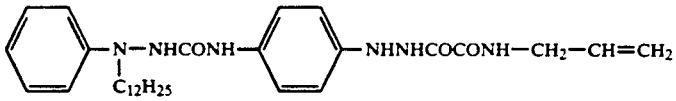
I-b-164
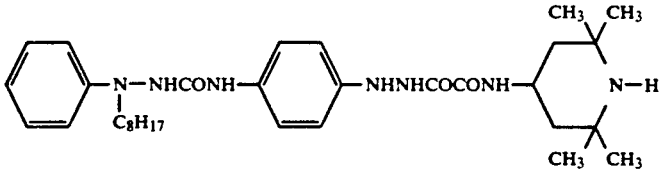
I-b-165
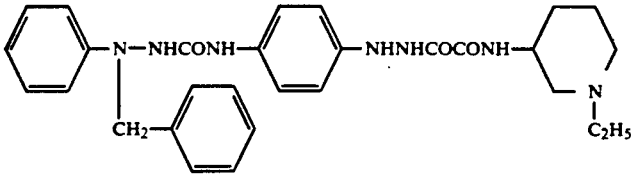

-continued
I-b-166
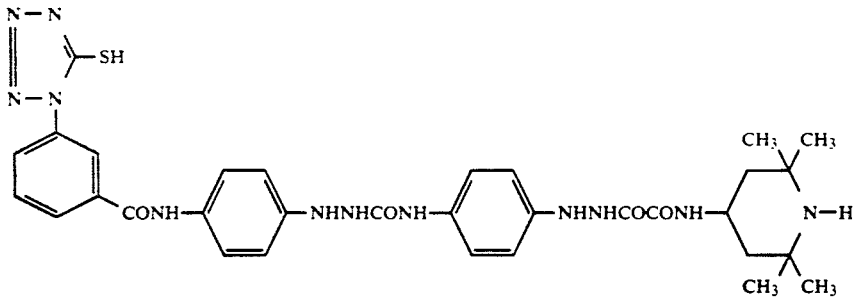
I-b-167
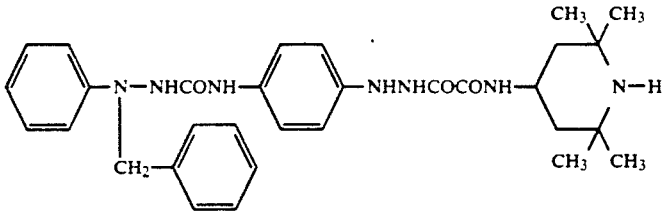
I-b-168
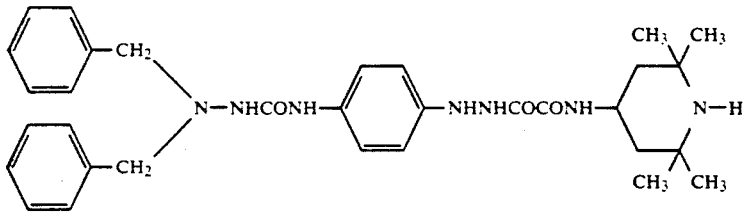
Of the above specific compounds, by taking examples of the compounds I - b - 45 and I - b - 47, their synthetic methods are shown below.
Synthesis of Compound I - b - 45
Synthesis scheme
compound I-b-45
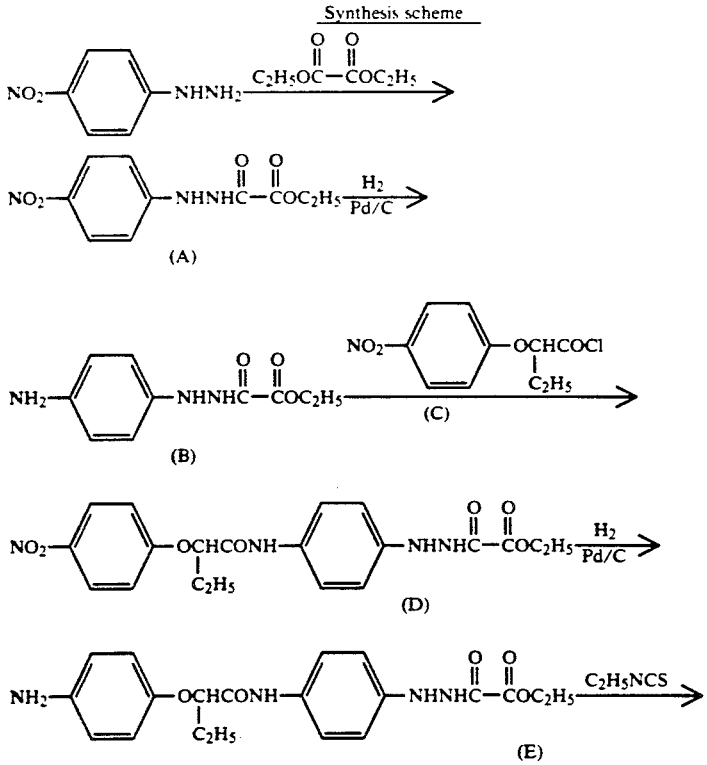

-continued

Synthesis scheme

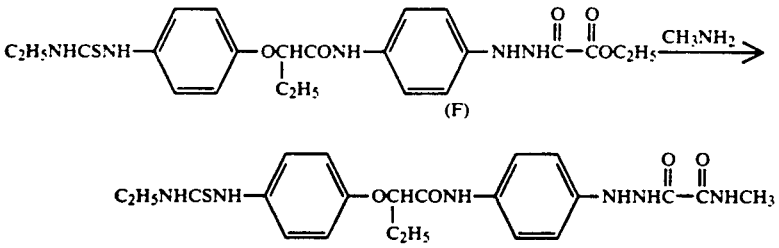

A mixture of 153 g of 4-nitrophenylhydrazide and 500 ml of diethyloxalate is refluxed for one hour. While the reaction is proceeded, ethanol is removed and finally the mixture is cooled to precipitate crystals. After filtration, the product is washed several times with petroleum ether and recrystallized. Then, 50 g of the crystals (A) obtained are dissolved by heating in 1000 ml of methanol, and reduced in a $H_2$ atmosphere pressurized at 50 psi in the presence of Pd/C (palladium-carbon) catalyst to obtain the compound (B).

To a solution of 22 g of the compound (B) dissolved in 200 ml of acetonitrile and 16 g of pyridine is added an acetonitrile solution containing 24 g of the compound (C) at room temperature. After the insolubles are filtered off, the filtrate is concentrated and purified by recrystallization to obtain 31 g of the compound (D).

Thirty (30) g of the compound (D) is hydrogenated similarly as described above to obtain 20 g of the compound (E).

To a solution of 10 g of the compound (E) dissolved in 100 ml of acetonitrile is added 3.0 g of ethylisothiocyanate, and the mixture is refluxed for one hour. After evaporation of the solvent, the residue is purified by recrystallization to obtain 7.0 g of the compound (F). To a solution of 5.0 g of the compound (F) dissolved in 50 ml of methanol is added methylamine (8 ml of aqueous 40% solution), followed by stirring. After concentrating slightly methanol, the precipitated solid is taken out and purified by recrystallization to obtain Compound I - b - 45.

Synthesis of Compound I - b - 47

Synthesis scheme

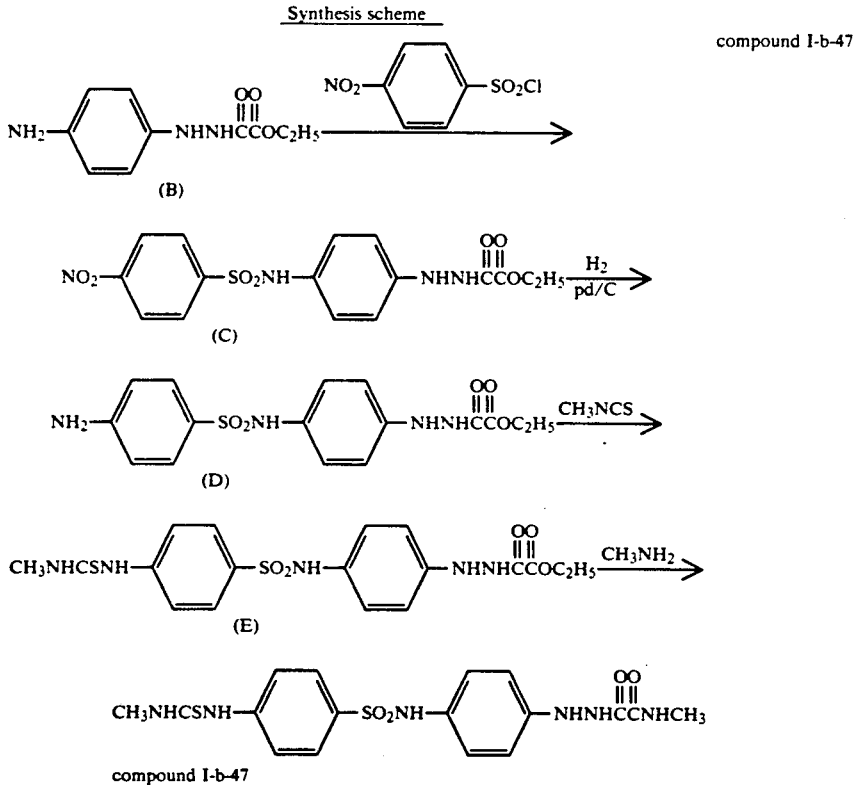

Into a stirred solution of 22 g of the compound (B) dissolved in 200 ml of pyridine, 22 g of p-nitrobenzenesulfonyl chloride is added. The reaction mixture is poured into water, and the post-precipitated solid is taken out to obtain the compound (C). From the compound (C), according to the same reactions as in the case of Compound I - b - 45 following the synthesis scheme, Compound I - b - 47 is obtained.

Next, Formula [I - c] is to be described.

Formula [I-c]

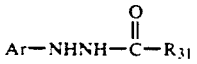

In Formula [I - c], Ar represents an aryl group containing at least one of diffusion resistant groups or silver halide adsorption promoting groups, and as the diffusion resistant group, a ballast group conventionally used in immobile additives for photography such as coupler, etc. is preferable. The ballast group is a group having 8 or more carbon atoms relatively inert to photographic characteristic, and can be chosen from, for example, alkyl groups, alkoxy groups, phenyl groups, alkylphenyl groups, phenoxy groups, alkylphenoxy groups, etc.

As the silver halide adsorption promoting group, there may be included the groups as disclosed in U.S. Pat. No. 4,385,108 such as thiourea group, thiourethane group, heterocyclic thioamide group, mercaptoheterocyclic group, triazole group, etc.

$R_{31}$ represents a substituted alkyl group, and the alkyl group may be a straight, branched or cyclic alkyl group, including methyl, ethyl, propyl, butyl, isopropyl, pentyl, cyclohexyl and the like.

As the substituent to be introduced into these alkyl group, there may be included groups of alkoxy (e.g. methoxy, ethoxy), aryloxy (e.g. phenoxy, p-chlorophenoxy), heterocyclic oxy (e.g. pyridyloxy), mercapto, alkylthio (e.g. methylthio, ethylthio), arylthio (e.g. phenylthio, p-chlorophenylthio), heterocyclic thio (e.g. pyridylthio, pyrimidylthio, thiadiazolylthio), alkylsulfonyl (e.g. methanesulfonyl, butanesulfonyl), arylsulfonyl (e.g. benzenesulfonyl), heterocyclic sulfonyl (e.g. pyridylsulfonyl, morpholinosulfonyl), acyl (e.g. acetyl, benzoyl), cyano, chloro, bromo, alkoxycarbonyl (e.g. ethoxycarbonyl, methoxycarbonyl), aryloxycarbonyl (e.g. phenoxycarbonyl), carboxy, carbamoyl, alkylcarbamoyl (e.g. N-methylcarbamoyl, N,N-dimethylcarbamoyl), arylcarbamoyl (e.g. N-phenylcarbamoyl), amino, alkylamino (e.g. methylamino, N,N-dimethylamino), arylamino (e.g. phenylamino, naphthylamino), acylamino (e.g. acetylamino, benzoylamino), alkoxycarbonylamino (e.g. ethoxycarbonylamino), aryloxycarbonylamino (e.g. phenoxycarbonylamino), acyloxy (e.g. acetyloxy, benzoyloxy), alkylaminocarbonyloxy (e.g. methylaminocarbonyloxy), arylaminocarbonyloxy (e.g. phenylaminocarbonyloxy), sulfo, sulfamoyl, alkylsulfamoyl (e.g. methylsulfamoyl), arylsulfamoyl (e.g. phenylsulfamoyl), etc.

The hydrogen atom of hydrazide may be also substituted with a substituent such as sulfonyl group (e.g. methanesulfonyl, toluenesulfonyl), acyl group (e.g. acetyl, trifluoroacetyl), oxalyl group (e.g. ethoxalyl), etc.

Representative compounds represented by the above Formula [I - c] are shown below.

I-c-1

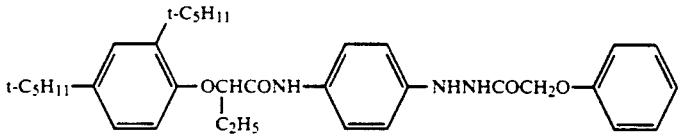

I-c-2

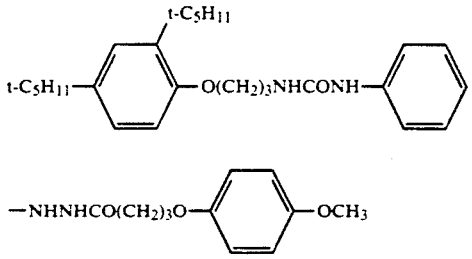

I-c-3

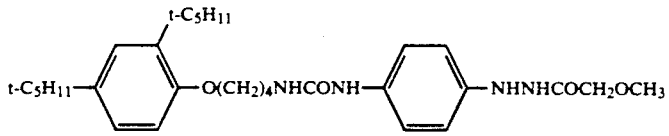

I-c-4

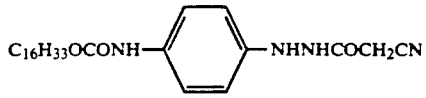

I-c-5

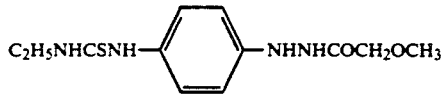

I-c-6

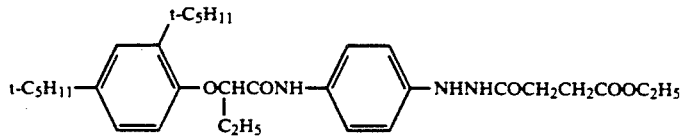

-continued
I-c-7
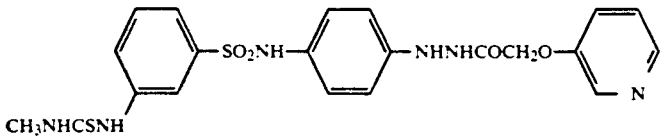
I-c-8
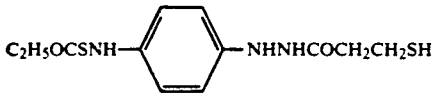
I-c-9
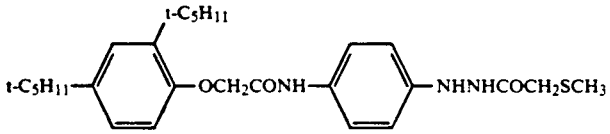
I-c-10
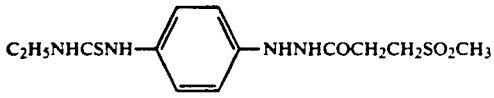
I-c-11
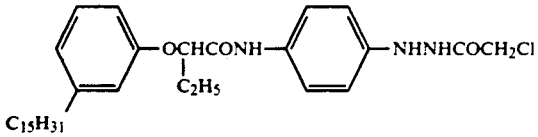
I-c-12
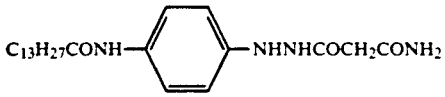
I-c-13
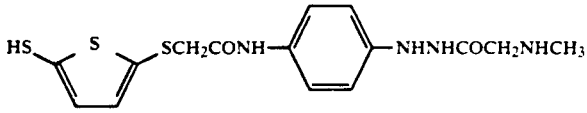
I-c-14
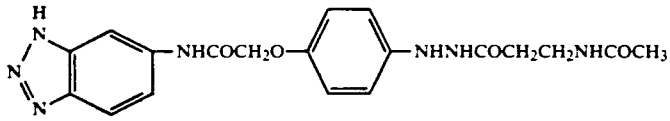
I-c-15
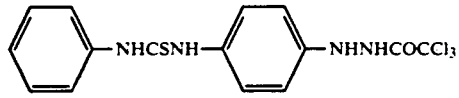
I-c-16
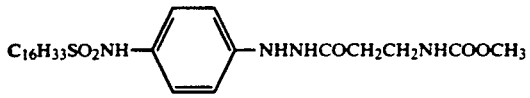
I-c-17
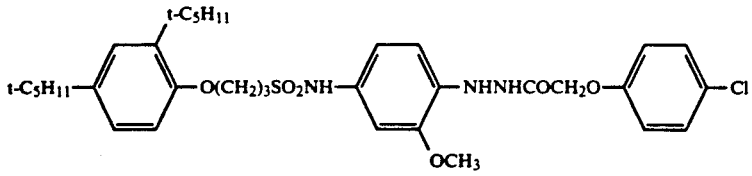
I-c-18
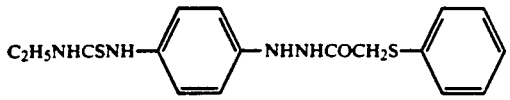

-continued
I-c-19
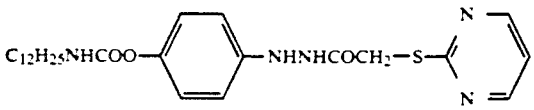
I-c-20
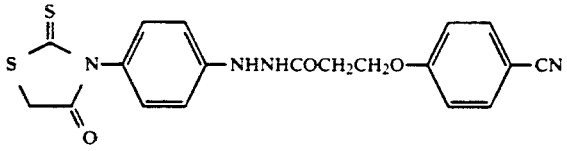
I-c-21
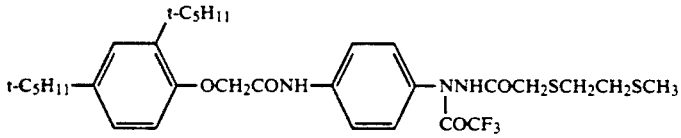
I-c-22
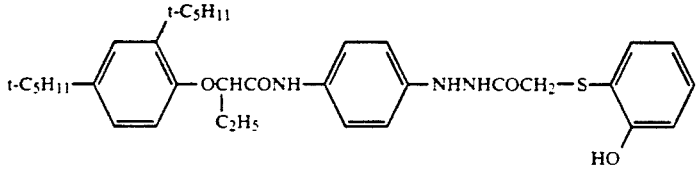
I-c-23
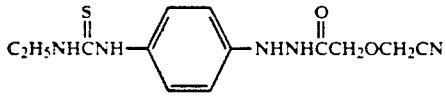
I-c-24
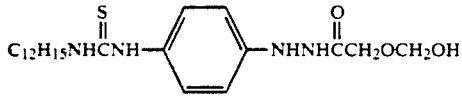
I-c-25
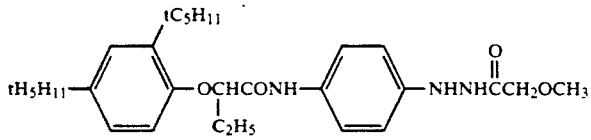
I-c-26
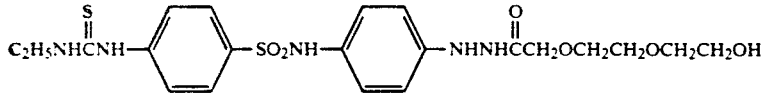
I-c-27
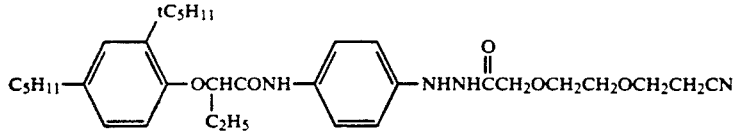
I-c-28
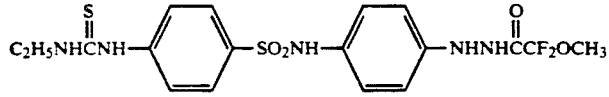
I-c-29
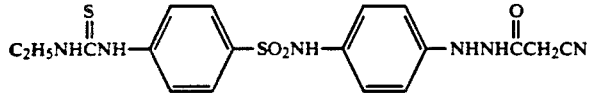
I-c-30
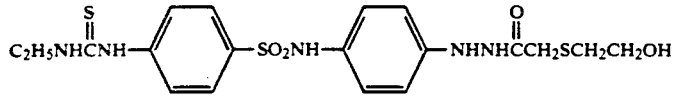

-continued
I-c-31
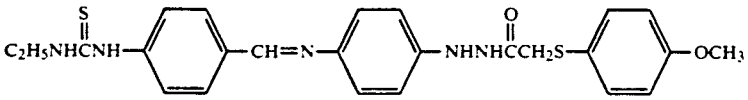
I-c-32
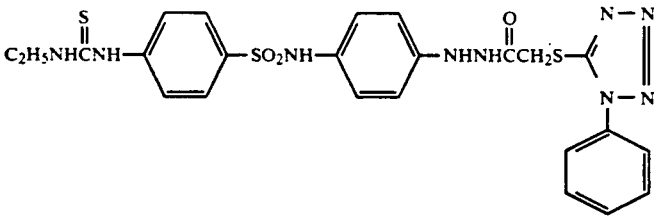
I-c-33
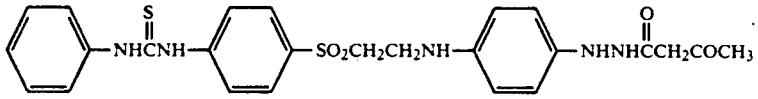
I-c-34
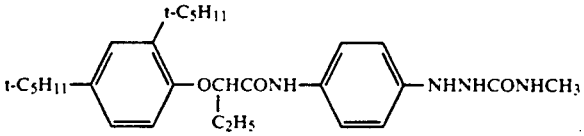
I-c-35
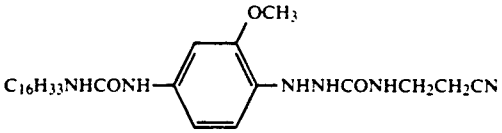
I-c-36
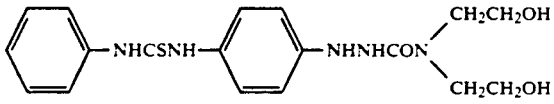
I-c-37
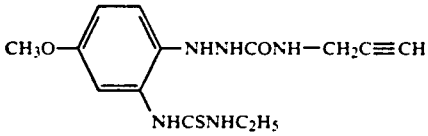
I-c-38
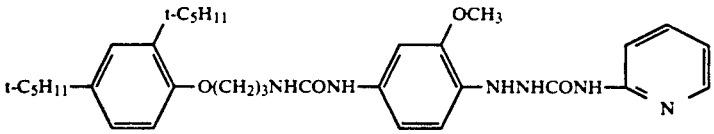
I-c-39
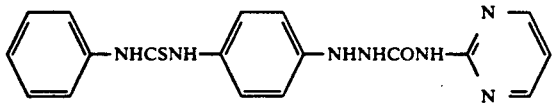
I-c-40
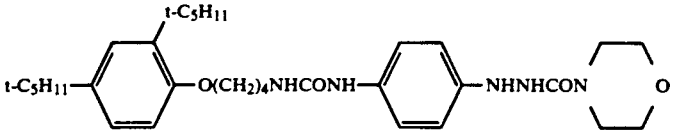
I-c-41
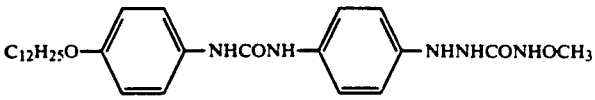

-continued
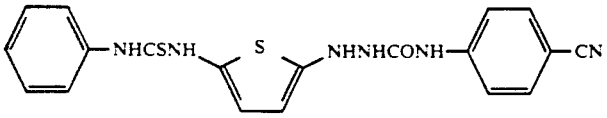
I-c-42
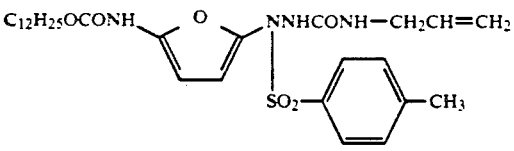
I-c-43
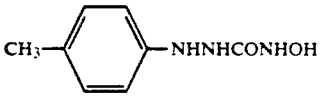
I-c-44
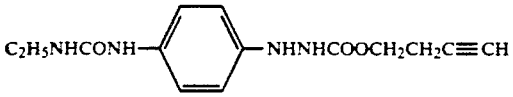
I-c-45
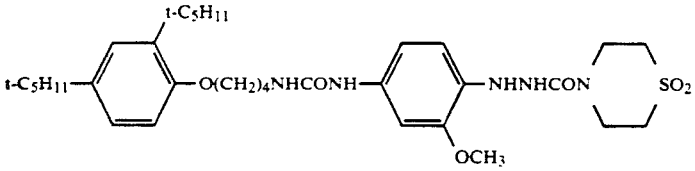
I-c-46
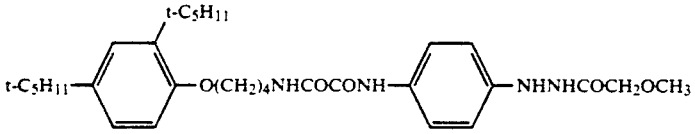
I-c-47
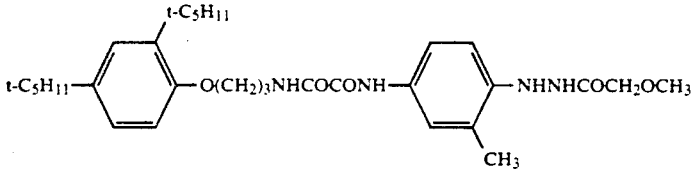
I-c-48
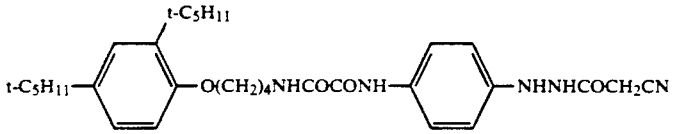
I-c-49
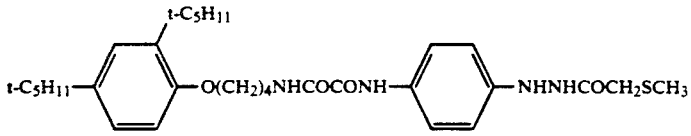
I-c-50
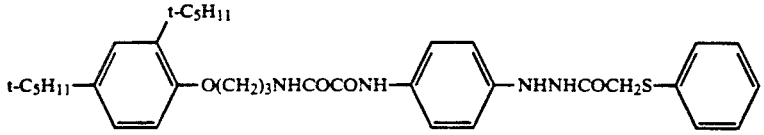
I-c-51
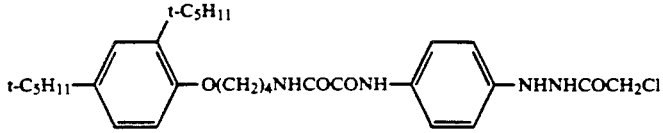
I-c-52

-continued
I-c-53
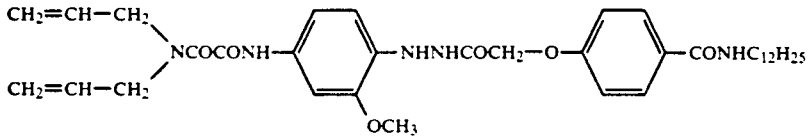
I-c-54
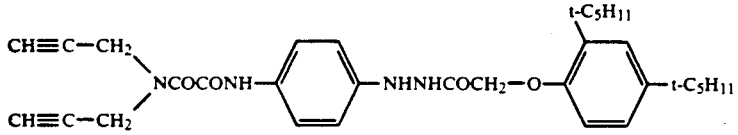
I-c-55
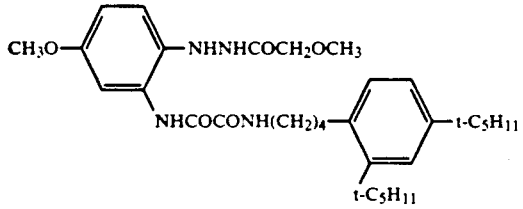
I-c-56
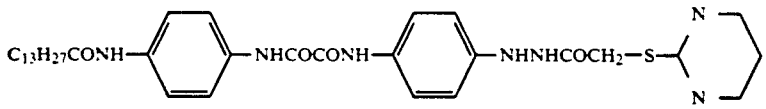
I-c-57
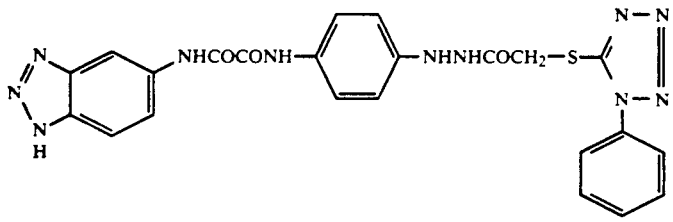
I-c-58
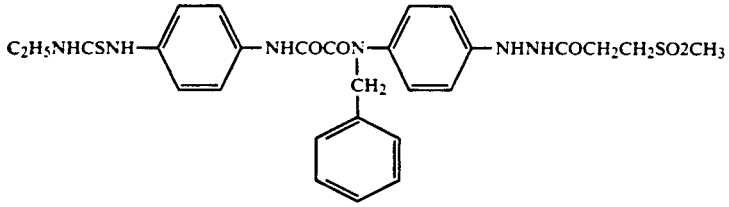
I-c-59
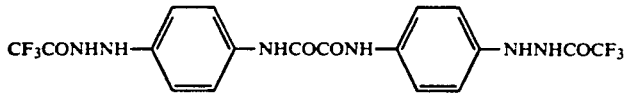
I-c-60
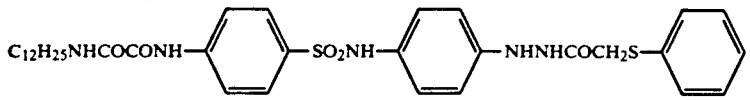
I-c-61
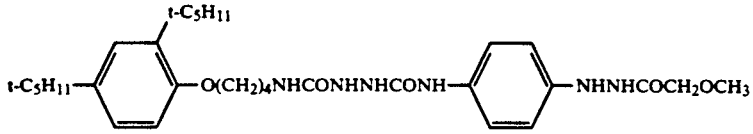
I-c-62
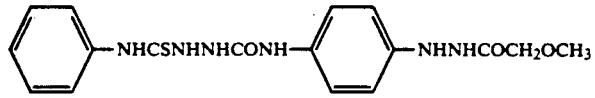

-continued
I-c-63
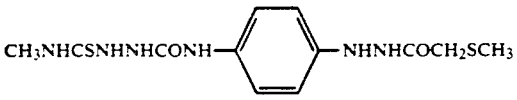
I-c-64
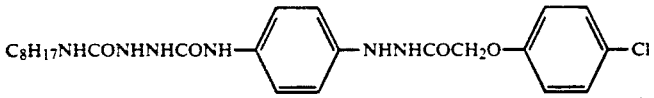
I-c-65
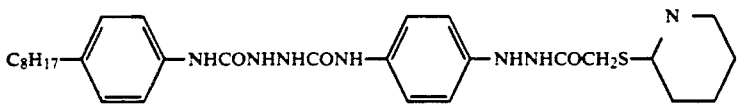
I-c-66
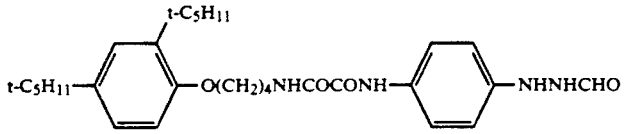
I-c-67
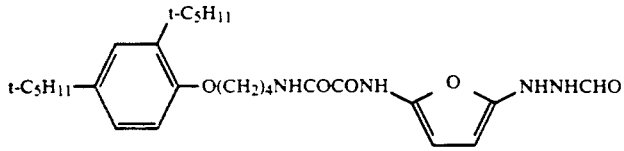
I-c-68
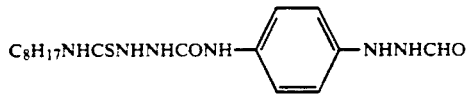
I-c-69
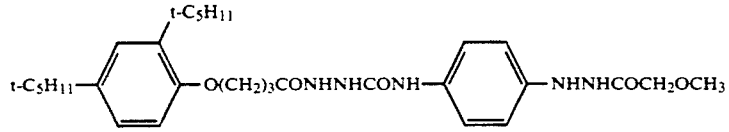
I-c-70
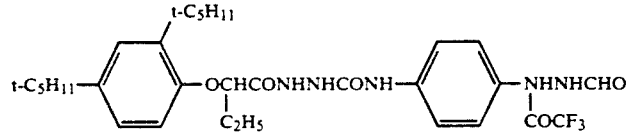
I-c-71
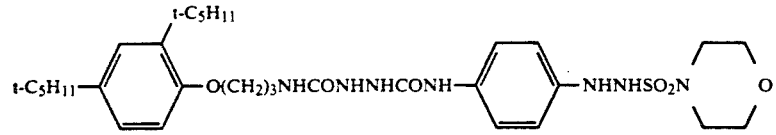
I-c-72
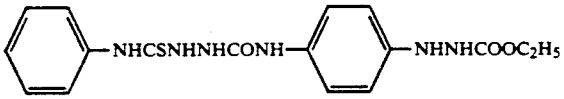
I-c-73
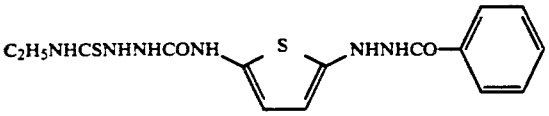
I-c-74
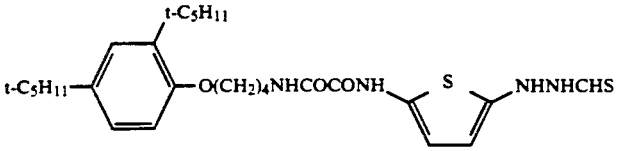

-continued
I-c-75
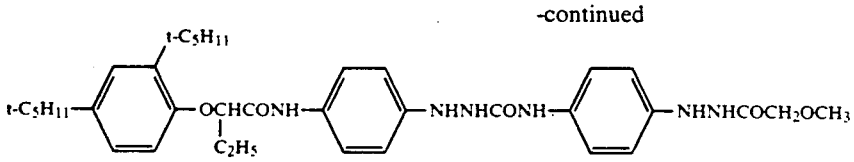
I-c-76
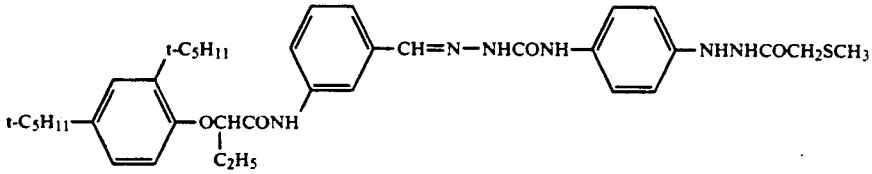
I-c-77
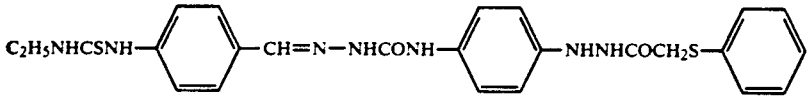
I-c-78
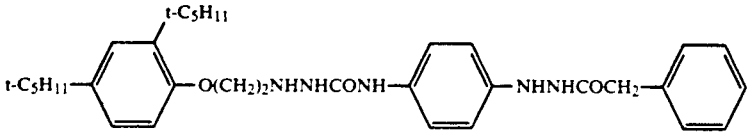
I-c-79
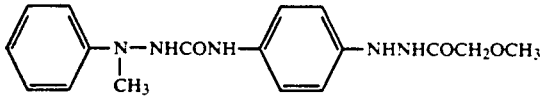
I-c-80
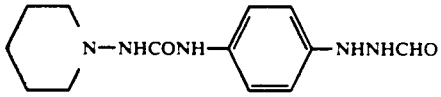
I-c-81
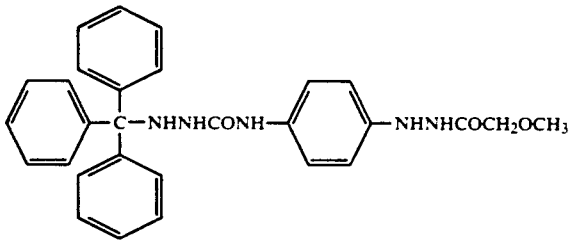
I-c-82
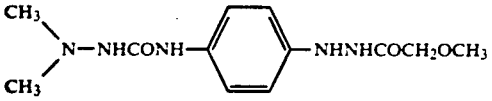
I-c-83
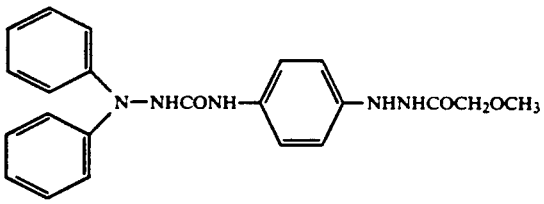
I-c-84
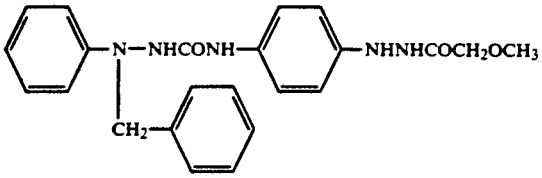

-continued
I-c-85
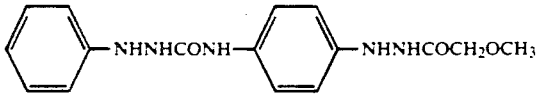
I-c-86
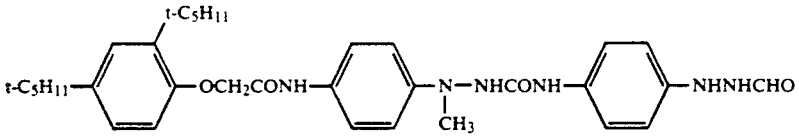
I-c-87
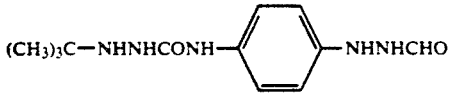
I-c-88
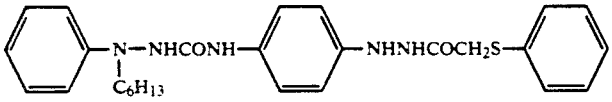
I-c-89
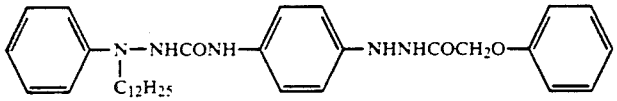
I-c-90
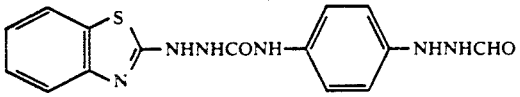
I-c-91
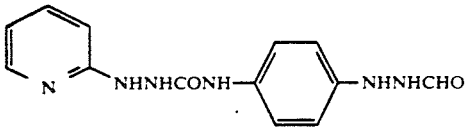
I-c-92
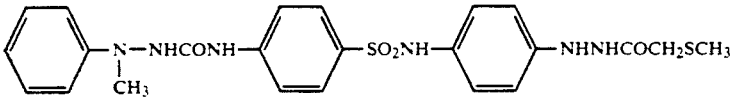
I-c-93
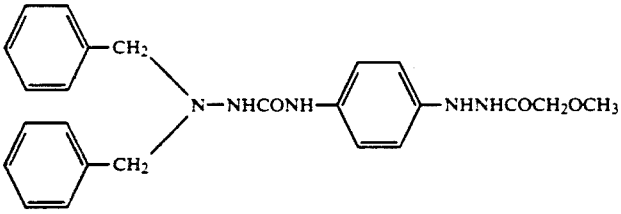
Next, a synthesis example of Compound I - c - 5 is described.
Synthesis of Compound I - c - 5
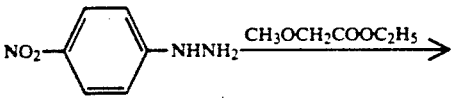
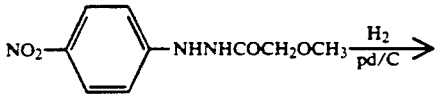
-continued
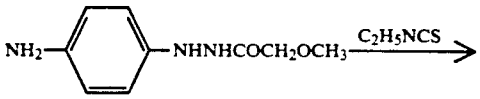
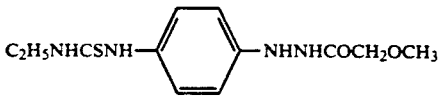
According to the procedure similar to the synthetic method of Compound I - b - 45, Compound I - c - 5 is obtained.

The amount of the compounds of Formulae [I - a], [I - b] and [I - c] contained in the light-sensitive silver halide material of the present invention should be preferably within the range of from $5\times10^{-7}$ to $5\times10^{-1}$ mol, more preferably $1\times10^{-5}$ to $1\times10^{-2}$ mol, per mol of silver halide contained in the light-sensitive silver halide photographic material.

Next, Formula [II] of the present invention is to be described.

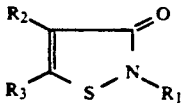

Formula [II]

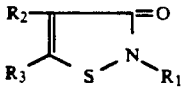

Formula [II]

In Formula, $R_1$ represents hydrogen atom, a straight or branched alkyl group, a cyclic alkyl group, an alkenyl group, an aralykyl group, an aryl group, a heterocyclic group, an alkylamino group, an arylamide groups, an alkylthioamide group, an arylthioamide group, an alkylsulfoamide group, an arylsulfoamide group; $R_2$, $R_3$ each represent hydrogen atom, a halogen atom, an alkyl group, a cyclic alkyl group, an aryl group, a cyano group, an alkylthio group, an arylthio group, an alkylsulfoxide group, an alkylsulfonyl group, a heterocyclic group. However, the above alkyl group, cyclic alkyl group, alkenyl group, heteocyclic group, aralkyl group and aryl group may have substituents.

In $R_1$ in Formula [II], the alkyl group and the alkenyl group may have 1 to 36, more preferably 1 to 18 carbon atoms. The cyclic alkyl group may have 3 to 12, more preferably 3 to 6 carbon atoms. These alkyl groups, alkenyl groups, cyclic alkyl groups, aralkyl groups, aryl groups, heterocyclic groups may have substituents, and the substituent may be chosen from halogen atom, nitro, cyano, thiocyano, aryl, alkoxy, aryloxy, carboxy, sulfoxy, alkylcarbonyl, arylcarbonyl, alkoxycarbonyl, aryloxycarbonyl, sulfo, acyloxy, sufamoyl, carbamoyl, acylamino, diacylamino, ureido, thioureido, urethane, thiourethane, sulfonamide, heterocyclic group, arylsulfonyloxy, alkylsulfonyloxy, arylsulfonyl, alkylsulfonyl group, arylthio, alkylthio, alkylsulfinyl, arylsulfinyl, alkylamino, dialkylamino, N-alkylanilino, N-arylanilino, N-acylamino, hydroxy and mercapto group, etc.

In $R_2$, $R_3$ in Formula [II], the alkyl group may have 1 to 18, more preferably 1 to 9 carbon atoms. The cyclic alkyl group may have 3 to 12, more preferably 3 to 6 carbon atoms. These alkyl groups, cyclic alkyl groups and aryl groups may have substituents, and the substituent may include halogen atom, nitro group, sulfone group, aryl group, hydroxy group, etc.

Representative examples of the compounds represented by the above Formula [II] (hereinafter called compounds of the present invention) are shown below, but the compounds of the present invention are not limited to these.

Exemplary compounds 2-methyl-3-isothiazolone;
2-(N-methylcarbamoyl)-3-isothiazolone;
5-methyl-2-(N-methylcarbamoyl)-3-isothiazolone;
2-(N-methylthiocarbamoyl)-3-isothiazolone;
4-bromo-5-methyl-2-(N-methylcarbamoyl)-3-isothiazolone;
4-cyano-5-methylthio-2-(N-methylcarbamoyl)-3-isothiazolone;
4-cyano-5-methylsulfinyl-2-(N-methylcarbamoyl)-3-isothiazolone;
4-cyano-5-methylsulfonyl-2-(N-methylcarbamoyl)-3-isothiazolone;
2-(N-n-butylcarbamoyl)-3-isothiazolone;
2-(N-t-octylcarbamoyl)-3-isothiazolone;
3-methyl-2-(N-phenylcarbamoyl)-3-isothiazolone;
4-cyano-5-methylthio-2-(N-phenylcarbamoyl)-3-isothiazolone;
4-bromo-5-methyl-2-(N-3-chlorophenylcarbamoyl)-3-isothiazolone;
5-bromomethyl-2-(N-3-chlorophenylcarbamoyl)-3-isothiazolone;
5-methyl-2-(N-3-chlorophenylcarbamoyl)-3-isothiazolone;
4-cyano-5-methylthio-2-(N-3-chlorophenylcarbamoyl)-3-isothiazolone;
2-(N-3-chlorophenylcarbamoyl)-3-isothiazolone;
5-methyl-2-(N-2-chlorophenylcarbamoyl)-3-isothiazolone;
5-bromomethyl-3-(N-2-chlorophenylcarbamoyl)-3-isothiazolone;
4-bromo-5-methyl-2-(N-3,4-dichlorophenylcarbamoyl)-3-isothiazolone;
5-methyl-2-(N-3,4-dichlorophenylcarbamoyl)-3-isothiazolone;
4-cyano-5-methylthio-2-(N-3,4-dichlorophenylcarbamoyl)-3-isothiazolone;
5-methyl-2-(N-4-tosylcarbamoyl)-3-isothiazolone;
4-cyano-5-methylthio-2-(N-4-tosylcarbamoyl)-3-isothiazolone;
4-bromo-5-methyl-2-(N-4-tosylcarbamoyl)-3-isothiazolone;
2-(N-n-propylcarbamoyl)-3-isothiazolone;
2-(N-ethylcarbamoyl)-3-isothiazolone;
2-(N-i-propylcarbamoyl)-3-isothiazolone;
4-bromo-2-(N-methylcarbamoyl)-3-isothiazolone;
2-(N-4-methoxyphenylcarbamoyl)-3-isothiazolone;
2-(N-2-methoxyphenylcarbamoyl)-3-isothiazolone;
2-(N-3-nitrophenylcarbamoyl)-3-isothiazolone;
2-(N-3,4-dichlorophenylcarbamoyl)-3-isothiazolone;
2-(N-n-dodecylcarbamoyl)-3-isothiazolone;
2-(N-2,5-dichlorophenylcarbamoyl)-3-isothiazolone;
2-(N-carboethoxymethylcarbamoyl)-3-isothiazolone;
2-(N-4-nitrophenylcarbamoyl)-3-isothiazolone;
5-methyl-2-(N-ethylcarbamoyl)-3-isothiazolone;
5-methyl-2-(N-ethylthiocarbamoyl)-3-isothiazolone;
5-chloro-2-(N-ethylcarbamoyl)-3-isothiazolone;
2-n-propyl-3-isothiazolone;
2-t-butyl-3-isothiazolone;
2-n-butyl-3-isothiazolone;
2-cyclohexyl-3-isothiazolone;
2-t-octyl-3-isothiazolone;
2-benzyloxy-3-isothiazolone;
5-chloro-2-methyl-3-isothiazolone;
5-chloro-2-benzyl-3-isothiazolone;
4,5-dichloro-2-methyl-3-isothizaolone;
2,4-dimethyl-3-isothizaolone;
4-methyl-2-(3,4-dichlorophenyl)-3-isothiazolone;
2-(3,4-dichlorophenyl)-3-isothiazolone;
4,5-dichloro-2-benzyl-3-isothiazolone;
4-bromo-5-chloro-2-methyl-3-isothiazolone;

4-bromo-2-methyl-3-isothiazolone;
2-hydroxymethyl-3-isothiazolone;
2-(α,β-diethylaminoethyl)-3-isothiazolone;
2-n-propyl-3-isothiazolone hydrochloride;
5-chloro-2-methyl-3-isothiazolone hydrochloride;
2-ethyl-3-isothiazolone hydrochloride;
2-methyl-3-isothiazolone hydrochloride;
2-benzyl-3-isothiazolone hydrochloride;
2-n-dodecyl-3-isothiazolone;
2-n-tetradecyl-3-isothiazolone;
2-(4-chlorobenzyl)-3-isothiazolone;
2-(2-chlorobenzyl)-3-isothiazolone;
2-(2,4-dichlorobenzyl)-3-isothiazolone;
2-(3,4-dichlorobenzyl)-3-isothiazolone;
2-(4-methoxybenzyl)-3-isothiazolone;
2-(4-methylbenzyl)-3-isothiazolone;
2-(2-ethoxyhexyl)-3-isothiazolone;
2-(2-phenylethyl)-3-isothiazolone;
2-(2-phenylethyl)-4-chloro-3-isothiazolone;
2-(1-phenylethyl)-3-isothiazolone;
2-n-decyl-3-isothiazolone;
2-n-octyl-3-isothiazolone;
2-t-octyl-4-chloro-3-isothiazolone;
2-t-octyl-4-bromo-3-isothiazolone;
2-n-nonyl-3-isothiazolone;
2-n-octyl-5-chloro-3-isothiazolone;
2-(4-nitrophenyl)-3-isothiazolone;
2-(carboethoxyphenyl)-3-isothiazolone;
5-chloro-2-methyl-3-isothiazolone monochloroacetate;
4,5-dichloro-2-methyl-3-isothiazolone monochloroacetate;
2-ethyl-3-isothiazolone monochloroacetate;
2-n-propyl-3-isothiazolone monochloroacetate;
2-benzyl-3-isothiazolone monochloroacetate.

With respect to these exemplary compounds, are described in French Patent 1,555,416, etc. about their synthetic methods and application examples to other fields.

Next, the compound represented by Formula [III] is to be described.

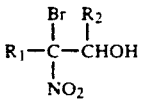

Formula [III]

wherein $R_1$ represents hydrogen, a lower alkyl group or hydroxymethyl group, and $R_2$ represents hydrogen or a lower alkyl group.

In the above Formula, $R_1$ represents hydrogen, a lower alkyl group or hydroxymethyl group, $R_2$ represents hydrogen or a lower alkyl group, and as the lower alkyl group, one having 1 to 5 carbon atoms, particularly 1 carbon atom, is preferred.

SPECIFIC EXAMPLE

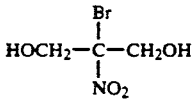

III-1

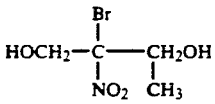

III-2

-continued

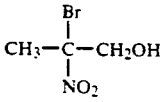

III-3

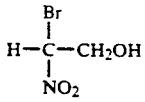

III-4

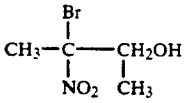

III-5

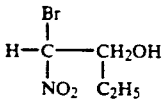

III-6

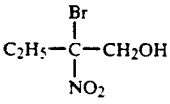

III-7

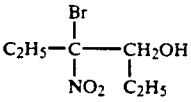

III-8

These compounds can be synthesized by referring to the following literatures, and also a part of them are commercially available from Mitsubishi Sekiyu K.K.

(1) Henry. Ecueil des travaux chimiques des Rays-Bas. 16 251
(2) Maas. Chemisches Zentralblatt. 1899 I 179
(3) E. Schmidt. Berichte der Deutchen Chemischen Gesellschaft. 52 387
(4) E. Schmidt. ibid. 55 317
(5) Henry. Chemisches Zentralblatt 1897 11 338

The compound represented by Formulae [II] or [III] may be used in an amount preferably within the range of $1\times10^{-3}$ to 10% by weight, preferably $1\times10^{-3}$ to 3% by weight, more preferably $5\times10^{-3}$ to 3% by weight, based on the hydrophilic colloid. However, the above range may be more or less varied depending on the kind of the light-sensitive silver halide photograpic material, the layer into which it is added, the coating method, etc., as a matter of course.

In one aspect of the invention, a light-sensitive silver halide photographic material according to the invention may contain a hydrazide derivative in an amount of $1\times10^{-5}$ to $1\times10^{-2}$ mol per mol of silver halide, and at least one member selected from the group of 2-methyl-3-isothiazolone, 5-chloro-2-methyl-3-isothiazolone, 4,5-dichloro-2-methyl-3-isothiazolone and a compound represented by the formula III-1:

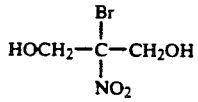

in an amount of $1\times10^{-3}$ to 3% by weight based on the hydrophilic colloid.

The compound of the present invention may be dissolved in a solvent which has no deleterious influence on photographic performance, chosen from water and organic solvents such as methanol, isopropanol, acetone, etc. and added as the solution into the hydrophilic colloid, or coated on the protective layer or incorporated by dipping into a sterilizing agent solution. Alternatively, there may be also employed the method in which the compound is dissolved in a high boiling solvent, a low boiling solvent or a solvent mixture of both, then emulsified in the presence of a surfactant and then added into a solution containing the hydrophilic colloid or further coated on the protective layer, etc.

The silver halide to be used in the present invention may be either one of silver chlorobromide, silver chloroiodobromide, silver iodobromide.

The grain size of the silver halide is not particularly limited, but one with a mean grain size of 0.5 μm or less may be preferable, and the so called mono-dispersed grains with 90% or more of the total grains falling within ±40% from the mean grain size as the center are preferred.

The silver halide grains may have a crystal habit which may be either cubic, tetradecahedral and octahedral, and may be also the tablet type grain as disclosed in Japanese Unexamined Patent Publication No. 108525/1983.

The silver halide grains in the silver halide emulsion layer of the present invention may be prepared according to any one of the single jet method such as the normal mixing method, the reverse mixing method, etc. or the double jet method according to the simultaneous mixing method, more preferably the simultaneous mixing method. Also, any of the ammonia method, the neutral method, the acidic method or the modified ammonia method as disclosed in Japanese Patent Publication No. 3232/1983, more preferably the acidic method or the neutral method, may be employed.

Also, within these silver halide grains, metal atoms such as iridium, rhodium, osmium, bismuth, cobalt, nickel, ruthenium, iron, copper, zinc, lead, cadmium, etc. may be contained.

When these metal atoms are to be contained, the content may be preferably within the range of $10^{-8}$ to $10^{-5}$ mol per mol of silver halide. The silver halide grains may be preferably of the surface latent image type.

The silver halide photographic emulsion in the silver halide emulsion layer according to the present invention (hereinafter called the silver halide photographic emulsion of the present invention) can be applied with chemical sensitization. The chemical sensitization method is inclusive of sulfur sensitization, reduction sensitization and noble metal sensitization, but in the present invention, it is preferable to perform chemical sensitization by sulfur sensitization alone. As the sulfur sensitizer, other than sulfur compounds contained in gelatin, various sulfur compounds such as thiosulfates, thioureas, thiazoles, rhodanines, etc. can be employed, and specifically the sulfur sensitizers as disclosed in U.S. Pat. Nos. 1,574,944, 2,410,689, 2,728,668 and Japanese Patent Publication No. 11892/1984 can be employed.

The silver halide photographic emulsion of the present invention can be imparted with photosensitivities to the respective desired photosensitive wavelength regions. Here, optical sensitization may be also effected by use of one or two or more kinds of spectral sensitizers. Examples of optically spectral sensitizers which can be used advantageously in the present invention may include cyanines, carbocyanines, melocyanines, trinucleus or tetranucleus melocyanines, trinucleus or tetranucleus cyanines, styryls, holopolar cyanines, hemine cyanines, oxonols, hemioxonols, etc., and these optically spectral sensitizers should preferably contain a basic group such as thiazoline, thiazole, etc. or a nucleus such as rhodanine, thiohydantoin, oxsazolidinedione, barbituric acid, thiobarbituric acid, pyrazolone, etc. as a part of the structure as the nitrogen containing heterocyclic nucleus, and such nucleus can be also substituted with alkyl, hydroxyalkylhalogen, phenyl, cyano, alkoxy, and also these optically spectral sensitizers may be condensed with carbon ring or heterocyclic ring.

In the silver halide photographic emulsion of the present invention, it is possible to add stabilizers such as tetrazaindenes, antifoggants such as triazoles, tetrazoles, covering power enhancers, antiirradiation agents such as oxanol dyes, dialkylaminobenzylidene dyes, etc., humectants such as polymer latices, and other additives used for photographic emulsions in general such as extenders, film hardeners to be used in combination outside of the present invention.

The support of the light-sensitive silver halide photographic material of the present invention may be one conventionally used such as polyester base, TAC base, baryta paper, laminated paper, glass plate, etc.

As the developer to be used for the light-sensitive silver halide photographic material of the present invention, there can be used either one of the developer used for light-sensitive silver halide photographic materials in general and the lith developer. The developing agent in these developers may include dihydroxybenzenes such as hydroquinone, chlorohydroquinone, catechol; 3-pyrazolidones such as 1-phenyl-3-pyrazolidone, 1-phenyl-4,4-dimethyl-3-pyrazolidone, 1-phenyl-4-methyl-3-pyrazolidone, 1-phenyl-4-methyl-4-hydroxymethyl-3-pyrazolidone; and further p-aminophenols such as N-methyl-p-aminophenol, N-(4-hydroxyphenyl)glycine; p-phenylenediamines such as β-methanesulfonamide ester, ethylaminotoluidine, N,N-diethyl-p-phenylenediamine; and ascorbic acids, etc., and it is used as an aqueous solution containing at least one of such developing agents.

The developer can be constituted by adding otherwise preservatives such as sodium sulfite, potassium sulfite, formaldehyde, sodium hydrogen sulfite, hydroxylamine, ethylene urea; developing inhibitors of inorganic salts such as sodium bromide, potassium bromide, potassium iodide; at least one organic inhibitor such as 1-phenyl-5-mercaptotetrazole, 5-nitrobenzimidazole, 5-nitrobenzotriazole, 5-nitroindazole, 5-methylbenzotriazole, 4-thiazolin-2-thione, etc.; alkali agents such as sodium hydroxide, potassium hydroxide, etc.; alkanolamines having development accelerating effect such as diethanolamine, triethanolamine, 3-diethylamine-1-propanol, 2-methylamino-1-ethanol, 3-diethylamino-1,2-propanediol, diisopropylamine, 5-amino-1-pentanol, 6-amino-1-hexanol, etc.; buffering agents having buffering effect in developer such as sodium carbonate, sodium phosphate, aqueous carbonic acid solution, aqueous phosphoric acid solution, etc.; salts such as sodium sulfate, sodium acetate, sodium citrate, etc.; hard water softeners according to the chelation effect such as sodium ethylenediaminetetraacetate, sodium nitrilotriacetate, sodium hydroxydiaminetriacetate, etc.; development film hardners such as glutaralhehyde; solvents for developing agents and organic inhibitors such as diethylene glycol, dimethylformaldehyde, ethyl alcohol, benzyl alcohol; development controlling agents such as methylimidazoline, methylimidazole, polyethylene glycol, dodecylpyridinium bromide, etc.

The pH of the developer is not particularly limited, but may be preferably within the range of pH 9 to 13.

An example of the construction of the preferable developer for developing the light-sensitive silver halide photographic material of the present invention is as follows. That is, it is a developer prepared by adding 20 to 60 g/liter of hydroquinone and 0.1 to 2 g/liter of 1-phenyl-4-methyl-4-hydroxymethyl-3-pyrazolidone or 0.1 to 2 g/liter of 1-phenyl-4,4-dimethyl-3-pyrazolidone as the developing agent, 10 to 200 g/liter of sodium sulfite or 10 to 200 g/liter of potassium sulfite as the developer preservative, 1 to 10 g of sodium bromide or potassium bromide as the developing inhibitor of inorganic salt, 1 to 50 g/liter of alkanolamines having development accelerating effect, 0.05 to 2 g/liter of 5-methylbenzotriazole or 0.01 to 2 g/liter of 5-nitroindazole as the organic inhibitor, 1 to 50 g/liter of sodium carbonate or 10 to 800 ml/liter of an aqueous phosphoric acid solution (1 mol/liter) as the buffering agent, 0.1 to 10 g/liter of disodium ethylenediaminetetraacetate as the chelating agent, and adjusting the pH to 11.0 to 12.5 with the use of an appropriate alkali agent (e.g. potassium hydroxide).

The light-sensitive silver halide photographic material of the present invention is developed with the developer as described above, and then the image is fixed via the process of fixing, water washing and drying. At this time, the developing temperature and the developing time in the developing process are not particularly limited, but the developing temperature may be preferably in the range of 20° to 45° C., and the developing time in the range of 15 seconds to 200 seconds.

The present invention is described in more detail by referring to Examples, but the present invention is not limited thereto.

EXAMPLE 1

Into an aqueous gelatin solution maintained at 40° C. were added simultaneously over 60 minutes an aqueous silver nitrate solution and an aqueous halide solution (KBr 40 mol %, NaCl 60 mol %) according to the controlled double jet method while maintaining pH at 3.0 and pAg at 7.7 to prepare a mono-dispersed silver chlorobromide emulsion with a mean grain size of 0.30 μm. The emulsion was desalted and washed with water in conventional manners, and then 15 mg of sodium thiosulfate was per mol of silver chlorobromide, followed by chemical ripening at 60° C. for 60 minutes.

Next, to the emulsion was added 1 g/Ag1 mol of 6-methyl-4-hydroxy-1,3-3a,7-tetrazaindene. As the sensitizing dye, 300 mg/Ag1 mol of the following compound (M) was added, and also 250 mg/Ag1 mol of a polyethylene glycol with a molecular weight of about 4000, the hydrazide compound of the present invention, and the compound represented by Formula [II] were added as shown in Table 1. Further, $1\times10^{-3}$ mol/Ag1 mol and $5\times10^{-3}$ mol of hydroquinone, a butyl acrylate latex polymer and an aqueous saponin solution as the extender were added to prepare an emulsion coating solution. Further, into the aqueous gelatin solution were added an aqueous sodium 1-decyl-2-(3-isopentyl)succinate-2-sulfonate solution, a methyl methacrylate copolymer with a mean particle size of 3.0 μm as the matte agent, and 2-hydroxy-4,6-dichloro-1,3,5-triazine sodium salt as the film hardener to prepare a coating solution for protective layer, which was coated by simultaneous overlaying together with the above emulsion coating solution on a PET base, followed by drying. At this time, the amount of gelatin attached was 2.5 g/m² in the emulsion layer, 1.0 g/m² in the protective layer, the amount of AgX grains attaches was 3.5 g/m² as calculated on silver, the amount of the butyl acrylate latex polymer attached was 2 g/m², the amount of the matte agent attached was 30 mg/m², the amount of the film hardener attached was 2 g/100 g gelatin based on the amount of gelatin attached of the the emulsion layer and the protective layer inclusive.

For the compound [II] of the present invention added in the silver halide emulsion layer, the compound of [II - 1], [II - 2], [II - 3], [II - 4] or [II - 5] shown below was employed.

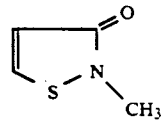
[II-1]

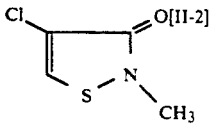
[II-2]

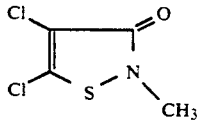
[II-3]

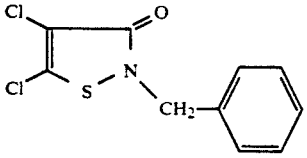
[II-4]

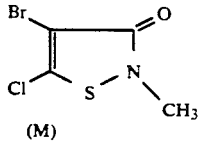
[II-5]

(M)

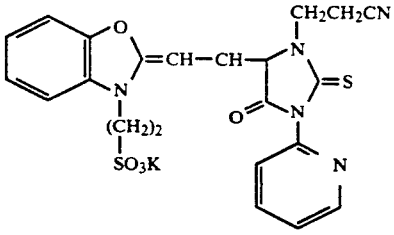

TABLE 1

| Sample No. | Hydrazide compound of the present invention: Compound No. | Hydrazide compound of the present invention: Amount added mol/Ag · 1 mol | Compound of Formula [II]: Compound No. | Compound of Formula [II]: Amount added mol/Ag · 1 mol |
|---|---|---|---|---|
| 1 | — | — | — | — |
| 2 | a | $2\times10^{-5}$ | — | — |
| 3 | b | $2\times10^{-5}$ | — | — |
| 4 | I-a-8 | $2\times10^{-5}$ | — | — |
| 5 | I-b-5 | $2\times10^{-5}$ | — | — |
| 6 | I-c-3 | $2\times10^{-5}$ | — | — |
| 7 | I-c-11 | $2\times10^{-5}$ | — | — |
| 8 | a | $2\times10^{-5}$ | II-1 | $3\times10^{-5}$ |

TABLE 1-continued

| Sample No. | Hydrazide compound of the present invention: Compound No. | Amount added mol/Ag · 1 mol | Compound of Formula [II]: Compound No. | Amount added mol/Ag · 1 mol |
|---|---|---|---|---|
| 9 | b | $2 \times 10^{-5}$ | II-2 | $3 \times 10^{-5}$ |
| 10 | I-a-8 | $2 \times 10^{-5}$ | II-2 | $3 \times 10^{-5}$ |
| 11 | I-a-8 | $2 \times 10^{-5}$ | II-3 | $3 \times 10^{-5}$ |
| 12 | I-b-5 | $2 \times 10^{-5}$ | II-3 | $3 \times 10^{-5}$ |
| 13 | I-b-5 | $2 \times 10^{-5}$ | II-4 | $3 \times 10^{-5}$ |
| 14 | I-c-3 | $2 \times 10^{-5}$ | II-2 | $3 \times 10^{-5}$ |
| 15 | I-c-3 | $2 \times 10^{-5}$ | II-3 | $3 \times 10^{-5}$ |
| 16 | I-c-3 | $2 \times 10^{-5}$ | II-5 | $3 \times 10^{-5}$ |
| 17 | I-c-11 | $2 \times 10^{-5}$ | II-1 | $3 \times 10^{-5}$ |
| 18 | I-c-11 | $2 \times 10^{-5}$ | II-2 | $3 \times 10^{-5}$ |

The amount of Compound of Formula II added corresponds to $1.3 \times 10^{-2}$ to $2.1 \times 10^{-2}$ % by weight based on the hydrophilic colloid.

As the comparative compound added in the silver halide emulsion layer, the compounds (a)-(b) shown below were employed.

a)

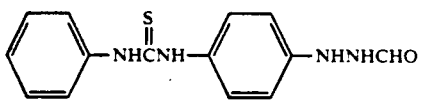

b)

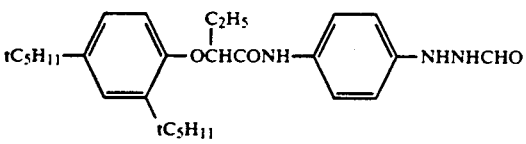

After the above samples of No. 1 to 18 were given stepwise exposure with a tungsten light source through a film wedge in conventional manner, they were developed with the developer shown below at 38° C. for 30 seconds, fixed, washed with water and dried, followed by evaluation of sensitivity, contrast and pepper fog. The contrast is represented by the slope (tan $\theta$ value) at the linear portion of the characteristic curve, and the degree of generation of pepper fog ranked at the four ranks of (5) no generation at all, (4) 1 to 2 in one field of vision, (3) small but low quality, (2) remarkably generated.

| | |
|---|---|
| (Developer recipe) | |
| Hydroquinone | 34 g |
| N-methyl-p-aminophenol | 0.23 g |
| Disodium ethylenediaminetetraacetate | 1 g |
| 3-Diethylamino-1,2-propane diol | 15 g |
| 5-Methylbenztriazole | 0.4 g |
| $Na_2SO_3$ | 76 g |
| NaBr | 3 g |
| NaCl | 1.3 g |
| 1 mol/liter phosphoric acid solution | 400 ml |
| (after addition of NaOH necessary for adjusting to pH 11.5, made up to one liter with water) | |
| (Fixer recipe) | |
| (Composition A) | |
| Ammonium thiosulfate (72.5% W/V aqueous solution) | 240 ml |
| Sodium sulfite | 17 g |
| Sodium acetate trihydrate | 6.5 g |
| Boric acid | 6 g |
| Sodium citrate dihydrate | 2 g |
| (Composition B) | |
| Pure water (deionized water) | 17 ml |
| Sulfuric acid (50% W/V aqueous solution) | 4.7 g |
| Aluminum sulfate (aqueous solution | 26.5 g |

-continued

| | |
|---|---|
| containing 8.1% W/V as calculated on $Al_2O_3$) | |

During use of the fixer, the above composition A and the composition B were dissolved in this order in 500 ml of water, and made up to one liter before use. The pH of the fixer was adjusted to 6 with acetic acid.

The results are shown in Table 2.

TABLE 2

| Sample No. | Sample content | Sensitivity | Contrast | Pepper fog |
|---|---|---|---|---|
| 1 | Comparison | 50 | 8 | 5 |
| 2 | Comparison | 98 | 12 | 2 |
| 3 | Comparison | 100 | 15 | 2 |
| 4 | Comparison | 120 | 17 | 2 |
| 5 | Comparison | 140 | 18 | 2 |
| 6 | Comparison | 130 | 18 | 2 |
| 7 | Comparison | 130 | 17 | 2 |
| 8 | Comparison | 95 | 10 | 2 |
| 9 | Comparison | 100 | 11 | 3 |
| 10 | Present invention | 120 | 16 | 5 |
| 11 | Present invention | 120 | 16 | 4 |
| 12 | Present invention | 140 | 17 | 5 |
| 13 | Present invention | 135 | 18 | 5 |
| 14 | Present invention | 120 | 18 | 5 |
| 15 | Present invention | 125 | 17 | 4 |
| 16 | Present invention | 130 | 17 | 4 |
| 17 | Present invention | 125 | 17 | 5 |
| 18 | Present invention | 125 | 16 | 5 |

As is apparent from the results in Table 2, it can be appreciated that the samples obtained according to the present invention inhibit remarkably generation of pepper fog without impairing sensitivity and contrast. In Table 2, sensitivity is relative sensitivity.

EXAMPLE 2

Samples were obtained by coating and drying in entirely the same manner as in Example 1 except for using the compound [III] in place of the compound [II], and exposure-treated and evaluated in the same manner. The sample contents and results are shown in Table 3.

TABLE 3

| Sample No. | Compound [I] | Compound [III] | Relative sensitivity | Contrast | Pepper fog |
|---|---|---|---|---|---|
| 19 | — | — | 50 | 8 | 5 |
| 20 | a | III-1 | 98 | 10 | 2 |
| 21 | b | III-1 | 100 | 11 | 3 |
| 22 | I-a-8 | III-1 | 120 | 16 | 5 |
| 23 | I-a-8 | III-2 | 120 | 16 | 4 |
| 24 | I-b-5 | III-1 | 140 | 17 | 5 |
| 25 | I-b-5 | III-3 | 135 | 18 | 5 |
| 26 | I-c-3 | III-1 | 120 | 18 | 5 |
| 27 | I-c-3 | III-4 | 125 | 17 | 5 |
| 28 | I-c-11 | III-6 | 125 | 17 | 5 |

Amount of compound was made $2 \times 10^{-5}$ mol/AgI mol for Formula [I], and $3 \times 10^{-5}$ mol/AgI mol for Formula [III]: which corresponds to $1.9 \times 10^{-2}$ to $2.4 \times 10^{-2}$ % by weight based on the hydrophilic colloid.

As is apparent from Table 3, it could be confirmed that the samples No. 22 to No. 28 by use of the compounds of the present invention had the effect of pepper fog inhibiting effect without impairing sensitivity and contrast as compared with comparative samples No. 19 to 21.

According to the present invention, a light-sensitive silver halide photographic material which is extremely high in contrast, and also improved in generation of peper fog without impairing tone hardening could be provided.

We claim:

1. A light-sensitive silver halide photographic material having a hydrophilic colloid layer containing at least one layer of a light-sensitive silver halide emulsion layer provided on a support, said light sensitive silver halide emulsion containing silver halide grains having a mean grain size of 0.5 μm or less and a hydrazide derivative wherein said hydrazide derivative is a compound represented by the formula (I-b-a) or (I-c):

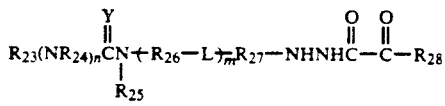

(I-b-a)

wherein $R_{23}$ and $R_{24}$ each represents a hydrogen atom, an alkyl group, a substituted alkyl group, a phenyl, naphthyl, cyclohexyl, pyridyl, pyrrolidyl group, or a substituted pyrrolidyl group; $R_{25}$ represents a hydrogen atom, a benzyl, alkoxy, alkyl group, or a substituted alkyl group; $R_{26}$ and $R_{27}$ each represents a divalent aromatic group, Y represents a sulfur atom or oxygen atom, L represents a divalent linking group; $R_{28}$ represents —NR'R" or —$OR_{29}$; R', R" and $R_{29}$ each represents a hydrogen atom, an alkyl group, a substituted alkyl group, a phenyl group, a substituted phenyl group, a naphthyl group or a substituted naphthyl group; m and n each represents 0 or 1, and when $R_{28}$ represents —$OR_{29}$, Y represents a sulfur atom or

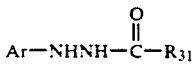

(I-c)

wherein Ar represents an aryl group containing at least one of a diffusion resistant group or a silver halide adsorption promoting group, and $R_{31}$ represents a substituted alkyl group;

and said hydrophilic colloid layer contains a compound represented by Formula II or Formula III present in an amount effective to inhibit fog formation:

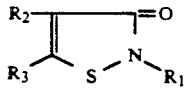

Formula II where $R_1$ represents hydrogen atom, a straight or branched alkyl group, a cyclic alkyl group, an alkenyl group, an aralkyl group, an aryl group, a heterocyclic group, an alkylamide group, an arylamide group, an alkylthioamide group, an arylthioamide group, an alkylsulfonamide group or an arylsulfonamide group, $R_2$ and $R_3$ each represent hydrogen atom, a halogen atom, an alkyl group, a cyclic alkyl group, an aryl group, a cyano group, an alkylthio group, an arylthio group, an arylsulfoxide group or an alkylsulfonyl group; with proviso that the above alkyl group, the cyclic alkyl group, the alkenyl group, aralkyl group, aryl group and heterocyclic group may have substituents; or

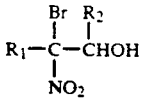

Formula III wherein $R_1$ represents hydrogen atom, a lower alkyl group or a hydroxymethyl group, and $R_2$ represents hydrogen atom or a lower alkyl group.

2. The light-sensitive silver halide photographic material according to claim 1, wherein the content of said hydrazide derivative is within the range of from $5\times10^{-7}$ to $5\times10^{-1}$ mol per mol of silver halide contained in the light-sensitive silver halide photographic material.

3. The light-sensitive silver, halide photographic material according to claim 2, wherein the content of said hydrazide derivative is within the range of from $1\times10^{-5}$ to $1\times10^{-2}$ mol per mol of silver halide contained in the light-sensitive silver halide photographic material.

4. The light-sensitive silver halide photographic material according to claim 1, wherein said compound represented by Formula III is

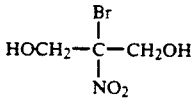

III-1

5. The light-sensitive silver halide photographic material according to claim 1, wherein the content of said compound represented by Formula III is within the range of $1\times10^{-3}$ to 10% by weight based on the hydrophilic colloid.

6. The light-sensitive silver halide photographic material according to claim 5, wherein the content of said compound represented by Formula III is within the range of $1\times10^{-3}$ to 3% by weight based on the hydrophilic colloid.

7. The light-sensitive silver halide photographic material according to claim 1, wherein said material contains: a hydrazide derivative in an amount of $1\times10^{-5}$ to $1\times10^{-2}$ mol per mol of silver halide, and at least one of 2-methyl-3-isothiazolone, 5-chloro-2-methyl-3-isothiazolone, 4,5-dichloro-2-methyl-3-isothiazolone and a compound represented by the formula:

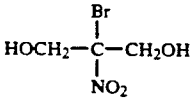

III-1 in an amount of $1\times10^{-3}$ to 3% by weight based on the hydrophilic colloid.

* * * * *